United States Patent
Tanaka et al.

(10) Patent No.: US 8,427,704 B2
(45) Date of Patent: Apr. 23, 2013

(54) IMAGE FORMING APPARATUS, IMAGE FORMING METHOD, AND IMAGE FORMING PROGRAM PRODUCT FOR PROCESSING PIXELS OF VERTICAL AND DIAGONAL LINES EXPRESSED BY INPUT MULTI-VALUE PIXEL DATA

(75) Inventors: Shinya Tanaka, Tokyo (JP); Hideomi Fujimoto, Kanagawa (JP); Mutsumi Namba, Tokyo (JP); Atsushi Hagiwara, Kanagawa (JP); Satoshi Takano, Tokyo (JP); Hiroyuki Nagano, Tokyo (JP)

(73) Assignee: Ricoh Company, Ltd, Tokyo (JP)

( * ) Notice: Subject to any disclaimer, the term of this patent is extended or adjusted under 35 U.S.C. 154(b) by 964 days.

(21) Appl. No.: 12/379,344

(22) Filed: Feb. 19, 2009

(65) Prior Publication Data

US 2009/0214238 A1    Aug. 27, 2009

(30) Foreign Application Priority Data

Feb. 22, 2008 (JP) ................................. 2008-040753
Mar. 13, 2008 (JP) ................................. 2008-064929
Jan. 15, 2009 (JP) ................................. 2009-007077

(51) Int. Cl.
*G06K 15/00* (2006.01)
(52) U.S. Cl.
USPC .............. 358/2.1; 399/51; 382/190; 382/209; 382/299
(58) Field of Classification Search ........................ None
See application file for complete search history.

(56) References Cited

U.S. PATENT DOCUMENTS

| | | | |
|---|---|---|---|
| 6,608,701 B1 * | 8/2003 | Loce et al. | 358/3.09 |
| 2001/0038712 A1 * | 11/2001 | Loce et al. | 382/190 |
| 2003/0212840 A1 | 11/2003 | Namba | |
| 2006/0209357 A1 | 9/2006 | Nishimura et al. | |
| 2007/0097201 A1 | 5/2007 | Kanzaki et al. | |
| 2007/0206788 A1 | 9/2007 | Hagiwara et al. | |
| 2008/0037073 A1 | 2/2008 | Fujimoto | |

FOREIGN PATENT DOCUMENTS

| | | |
|---|---|---|
| JP | 10-257326 | 9/1998 |
| JP | 2000-103117 | 4/2000 |
| JP | 2001-063134 | 3/2001 |
| JP | 2006-295624 | 10/2006 |

\* cited by examiner

*Primary Examiner* — Twyler Haskins
*Assistant Examiner* — Christopher D Wait
(74) *Attorney, Agent, or Firm* — Harness, Dickey & Pierce, P.L.C.

(57) ABSTRACT

An image forming apparatus includes an image forming unit for forming an image; a status conversion unit for converting the multi-value pixel data into status values; plural reference look-up tables each indicating an association between an arrangement of the status values of a target pixel and adjacent pixels in a pixel window and an output data value of the multi-value pixel data to be output; a determining unit for determining a target reference look-up table based on the arrangement; and a generating unit configured to change an input data value of the multi-value pixel data, into the output data value of the determined target reference look-up table, and for outputting the multi-value pixel data to the image forming unit.

18 Claims, 24 Drawing Sheets

FIG.4

(IN CASE OF WHITE THRESHOLD:1, BLACK THRESHOLD:14)

| INPUT 4 bit | AFTER CONVERTED INTO THREE STATUSES |
|---|---|
| 0 | ○:WHITE |
| 1 | ○:WHITE |
| 2 | ×:HALFTONE |
| 3 | ×:HALFTONE |
| 4 | ×:HALFTONE |
| 5 | ×:HALFTONE |
| 6 | ×:HALFTONE |
| 7 | ×:HALFTONE |
| 8 | ×:HALFTONE |
| 9 | ×:HALFTONE |
| 10 | ×:HALFTONE |
| 11 | ×:HALFTONE |
| 12 | ×:HALFTONE |
| 13 | ×:HALFTONE |
| 14 | ●:BLACK |
| 15 | ●:BLACK |

WHITE THRESHOLD:1 ⟶ (row 1)

BLACK THRESHOLD:14 ⟶ (row 14)

FIG.5

| (STATUS VALUE) LEFT TARGET RIGHT | | | DESCRIPTION | REFERENCE LUT |
|---|---|---|---|---|
| ○ | ○ | ● | LEADING WHITE PIXEL CHANGING FROM WHITE TO BLACK | LEADING WHITE PIXEL LUT |
| ○ | ● | ● | LEADING BLACK PIXEL CHANGING FROM WHITE TO BLACK | LEADING BLACK PIXEL LUT |
| ● | ○ | ○ | TRAILING WHITE PIXEL CHANGING FROM BLACK TO WHITE | TRAILING WHITE PIXEL LUT |
| ● | ● | ○ | TRAILING BLACK PIXEL CHANGING FROM BLACK TO WHITE | TRAILING BLACK PIXEL LUT |
| ● | ○ | ● | ISOLATED WHITE PIXEL CHANGING FROM BLACK TO WHITE AND THEN TO BLACK | ISOLATED WHITE PIXEL LUT |
| ○ | ● | ○ | ISOLATED BLACK PIXEL CHANGING FROM WHITE TO BLACK AND THEN TO WHITE | ISOLATED BLACK PIXEL LUT |
| × | — | — | HALFTONE PIXEL INCLUDED IN MATRIX | NO PROCESS: INPUT DATA IS PASSED THROUGH |
| — | × | — | HALFTONE PIXEL INCLUDED IN MATRIX | NO PROCESS: INPUT DATA IS PASSED THROUGH |
| — | — | × | HALFTONE PIXEL INCLUDED IN MATRIX | NO PROCESS: INPUT DATA IS PASSED THROUGH |
| ● | ● | ● | CONTINUOUSLY BLACK PIXELS OF BLACK/BLACK/BLACK | NO PROCESS: INPUT DATA IS PASSED THROUGH |
| ○ | ○ | ○ | CONTINUOUSLY WHITE PIXELS OF WHITE/WHITE/WHITE | NO PROCESS: INPUT DATA IS PASSED THROUGH |

FIG.6

(WHITE THRESHOLD:1, BLACK THRESHOLD:14)

| | ISOLATED BLACK LUT | LEADING BLACK LUT | TRAILING BLACK LUT | ISOLATED WHITE LUT | LEADING WHITE LUT | TRAILING WHITE LUT |
|---|---|---|---|---|---|---|
| VERTICAL LINE THICKENING PROCESS | 15 | 15 | 15 | 0 | 0 | 4 |
| VERTICAL LINE THINNING PROCESS | 11 | 12 | 13 | 0 | 0 | 0 |

FIG.10
| INPUT MULTI-VALUE PIXEL DATA | | | | | | | OUTPUT MULTI-VALUE PIXEL DATA | | | | | |
|---|---|---|---|---|---|---|---|---|---|---|---|---|
| 0 | 0 | 15 | 0 | 0 | 0 | | 0 | 0 | 15 | 4 | 0 | 0 |
| 0 | 0 | 15 | 0 | 0 | 0 | | 0 | 0 | 15 | 4 | 0 | 0 |
| 0 | 0 | 15 | 0 | 0 | 0 | | 0 | 0 | 15 | 4 | 0 | 0 |
| 15 | 15 | 15 | 15 | 15 | 15 | | 15 | 15 | 15 | 15 | 15 | 15 |
| 0 | 0 | 15 | 0 | 0 | 0 | | 0 | 0 | 15 | 4 | 0 | 0 |
| 0 | 0 | 15 | 0 | 0 | 0 | | 0 | 0 | 15 | 4 | 0 | 0 |
TRAILING WHITE EDGE PROCESS
TRAILING WHITE DATA ⇒ 4
OUTPUT IMAGE BEFORE CORRECTION
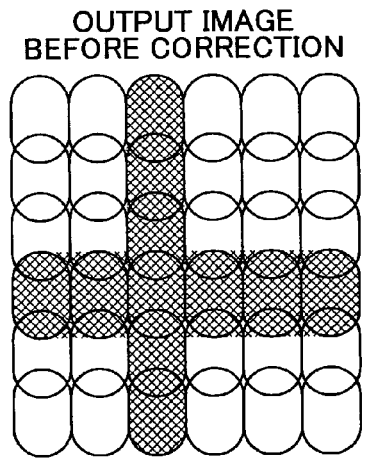
(a)
OUTPUT IMAGE AFTER CORRECTION
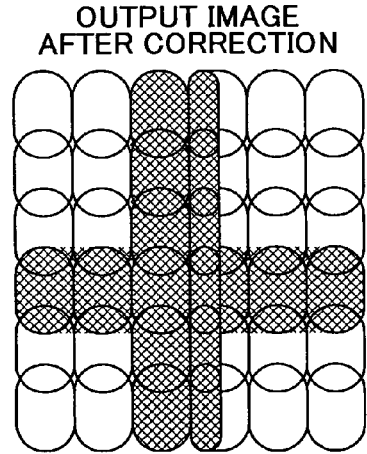
(b)

FIG.18
|   | n-1 | n | n+1 |   |   |
|---|---|---|---|---|---|
|   | 0 | 0 | 15 | 0 | 0 | 0 |
| n-1 | 0 | 0 | 15 | 0 | 0 | 0 |
| n | 0 | 0 | 15 | 0 | 0 | 0 |
|   | 15 | 15 | 15 | 15 | 15 | 15 |
|   | 0 | 0 | 15 | 0 | 0 | 0 |
|   | 0 | 0 | 15 | 0 | 0 | 0 |
TRAILING BLACK EDGE PROCESS ADJACENT ADDING DATA ⇒ 4
| 0 | 0 | 15 | 4 | 0 | 0 |
|---|---|---|---|---|---|
| 0 | 0 | 15 | 4 | 0 | 0 |
| 0 | 0 | 15 | 4 | 0 | 0 |
| 15 | 15 | 15 | 15 | 15 | 15 |
| 0 | 0 | 15 | 4 | 0 | 0 |
| 0 | 0 | 15 | 4 | 0 | 0 |
OUTPUT IMAGE BEFORE CORRECTION
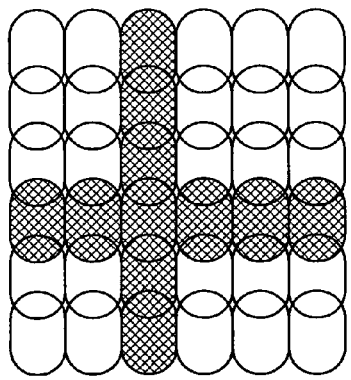
(a)
OUTPUT IMAGE AFTER CORRECTION
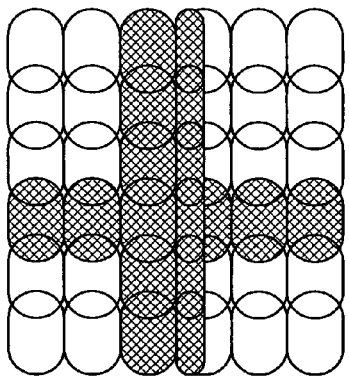
(b)

FIG.20
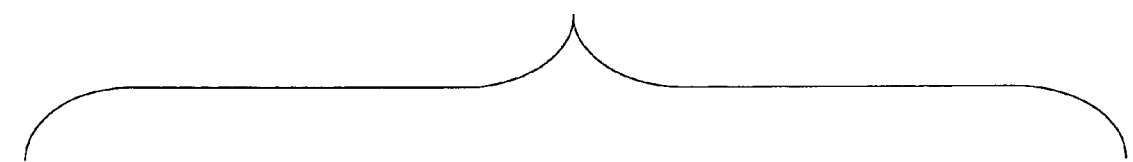
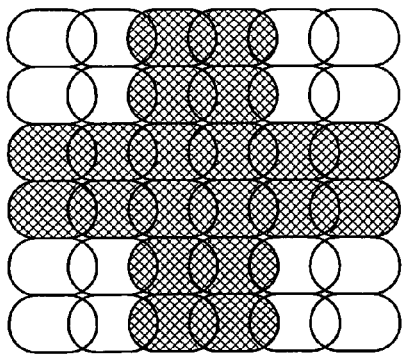
OUTPUT IMAGE
BEFORE CORRECTION
(a)
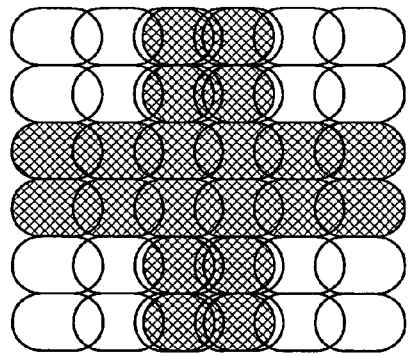
OUTPUT IMAGE
AFTER CORRECTION
(b)

| MAIN:SUB=1:1 | | |
|---|---|---|
| 010 | ○●○ | 11 |
| 100 | ○●○ | 13 |
| 001 | ○●○ | 13 |
| 111 | ○●○ | 13 |
| 111 | ○●● | 12 |
| 011 | ○●● | 12 |
| 110 | ○●● | 15 |
| 001 | ○●● | 12 |
| 111 | ●●○ | 12 |
| 011 | ●●○ | 15 |
| 110 | ●●○ | 12 |
| 100 | ●●○ | 12 |

(b)

| MAIN:SUB=2:1 | | |
|---|---|---|
| 010 | ○●○ | 15 |
| 100 | ○●○ | 15 |
| 001 | ○●○ | 15 |
| 111 | ○●○ | 15 |
| 100 | ●○○ | 4 |
| 010 | ●○○ | 2 |

IMAGE FORMING APPARATUS, IMAGE FORMING METHOD, AND IMAGE FORMING PROGRAM PRODUCT FOR PROCESSING PIXELS OF VERTICAL AND DIAGONAL LINES EXPRESSED BY INPUT MULTI-VALUE PIXEL DATA

BACKGROUND OF THE INVENTION

1. Field of the Invention

The present invention relates to an image forming apparatus, an image forming method, and an image forming program product.

2. Description of the Related Art

In an electrophotographic image forming apparatus such as a laser printer, a digital copier, a fax machine, and a multifunction peripheral, an image creating unit typically performs a negative/positive (N/P) process by radiating a light beam to a position where toner is to be applied in correspondence with an input image (hereinafter, "toner application part") to form an electrostatic latent image, and applying toner to the electrostatic latent image to develop the image. The volume of the applied toner varies depending on the diameter of the beam spot formed as the light beam reaches a scanning target surface, and also depending on developing conditions. Therefore, even if the same image data was input, the output images would vary.

For example, when an image of a vertical line having a width corresponding to one pixel (vertical line of one pixel) is output, even if a light beam were radiated for a period of time corresponding to a line of one pixel, the thickness of the vertical line in the resultant output image would be different from that of the original image. This is because the beam spot diameter and developing conditions vary depending on the model and the lot number of the image forming apparatus, and also depending on each individual machine.

In a case where a main scanning pixel line (vertical) and a sub scanning pixel line (horizontal) are output on the same recording medium, the horizontal line and vertical line in the output image may have different thicknesses depending on the beam spot diameter and developing conditions. Particularly, when a sheet with an image obtained from a copy operation is used as the original for another copy operation, i.e., when a grandchild copy is taken, the above phenomenon becomes significant.

This phenomenon, in which the output image includes a line with a different thickness from that of the original image, does not only appear when black or colored toner is applied to form the lines of the image. The same phenomenon also appears for lines in the background of the recording medium where toner is not applied. That is, the lines in the background may become thinner or thicker than those of the original image.

The above problem does not only arise when forming a monochrome image using black toner, but also when forming a color image using color toner.

Conventionally, there has been proposed a technique in an attempt to solve such a problem. Specifically, a vertical line having a width corresponding to one dot is detected based on a pattern of the multi-value image data, which pattern includes a target pixel in the input image data and pixels adjacent to the target pixel in the main scanning direction. Then, the printed dots of the vertical line are reduced in size, so that the vertical line is made thinner in the formed image (see patent document 1).

In the above conventional technology, the process of determining the pattern of the multi-value two-bit input data is performed with hardware, and a description is given for a case where the input multi-value data is expressed by 2 bits. There is no description of cases where the number of bits exceeds 2 bits (4 values).

Patent Document 1: Japanese Laid-Open Patent Application No. 2001-63134

In the conventional technology disclosed in patent document 1, the lines in the formed image are made thinner. However, this technology needs to be modified for better image quality. That is, in an image output by the electrophotographic image forming process, the vertical lines do not only become thicker, but may also become thinner than those of the original image. The above conventional technology is not capable of thickening the vertical lines to solve the problem where the lines become thinner than those of the original image.

Furthermore, in addition to determining whether the lines in the formed image become thicker or thinner than those of the original image, it is necessary to determine whether the vertical lines need to be made thinner or thicker in consideration of the relationship between the widths of the vertical lines and the horizontal lines. However, the conventional technology is not capable of flexibly addressing such a relationship. Moreover, the conventional technology only addresses vertical lines, and does not address diagonal lines.

Furthermore, the conventional technology disclosed in patent document 1 indicates that the input image data is expressed by multi-value data. However, the image pattern is determined based on only 2 bits (4 values). For this reason, if the technology were applied to image data with a larger number of bits, the hardware configuration would be extremely extensive. Accordingly, such a configuration would be complex and expensive.

SUMMARY OF THE INVENTION

The present invention provides an image forming apparatus, an image forming method, and an image forming program product, in which one or more of the above-described disadvantages are eliminated.

A preferred embodiment of the present invention provides an image forming apparatus, an image forming method, and an image forming program product capable of processing pixels of vertical lines and diagonal lines expressed by input multi-value pixel data, with a simple configuration and in an appropriate manner.

According to a first aspect of the present invention, there is provided an image forming apparatus including an image forming unit configured to form an image based on input multi-value pixel data formed by an input data value or output multi-value pixel data formed by an output data value; a status conversion unit configured to convert the input multi-value pixel data into status values based on an achromatic threshold and a maximum color threshold, wherein each of the status values corresponds to one of at least three kinds of status values including an achromatic status value, a maximum color status value, and a halftone status value; plural reference look-up tables each indicating an association between an arrangement of the status values of the pixels in a pixel window, and an output data value for forming the output multi-value pixel data, wherein the pixels arranged in the pixel window correspond to the status values which are converted by the status conversion unit from the input multi-value pixel data, and includes a target pixel and a predetermined number of adjacent pixels provided on both sides of the target pixel; a first reference look-up table determining unit configured to determine a target reference look-up table from among the plural reference look-up tables based on the arrangement of the status values of the target pixel and the adjacent pixels in the pixel window; and an output data generating unit configured to change the input data value of the input multi-value pixel data, into the output data value of the target reference look-up table determined by the first reference look-up table determining unit to form the output multi-value pixel data, and to output the output multi-value pixel data to the image forming unit.

According to a second aspect of the present invention, there is provided an image forming method including an image forming step of forming an image based on input multi-value pixel data formed by an input data value or output multi-value pixel data formed by an output data value; a status conversion step of converting the input multi-value pixel data into status values based on an achromatic threshold and a maximum color threshold, wherein each of the status values corresponds to one of at least three kinds of status values including an achromatic status value, a maximum color status value, and a halftone status value; a first reference look-up table determining step of determining a target reference look-up table from among plural reference look-up tables based on an arrangement of the status values of a target pixel and adjacent pixels in a pixel window, each of the plural reference look-up tables indicating an association between the arrangement of the status values of the pixels in the pixel window and an output data value for forming the output multi-value pixel data, wherein the pixels arranged in the pixel window correspond to the status values which are converted at the status conversion step from the input multi-value pixel data, and includes the target pixel and a predetermined number of the adjacent pixels provided on both sides of the target pixel; and an output data generating step of changing the input data value of the input multi-value pixel data, into the output data value of the target reference look-up table determined at the first reference look-up table determining step to form the output multi-value pixel data, and outputting the output multi-value pixel data for use at the image forming step.

According to a third aspect of the present invention, there is provided an image forming program product including instructions for causing a computer to perform the steps of an image forming step of forming an image based on input multi-value pixel data formed by an input data value or output multi-value pixel data formed by an output data value; a status conversion step of converting the input multi-value pixel data into status values based on an achromatic threshold and a maximum color threshold, wherein each of the status values corresponds to one of at least three kinds of status values including an achromatic status value, a maximum color status value, and a halftone status value; a first reference look-up table determining step of determining a target reference look-up table from among plural reference look-up tables based on an arrangement of the status values of a target pixel and adjacent pixels in a pixel window, each of the plural reference look-up tables indicating an association between the arrangement of the status values of the pixels in the pixel window and an output data value for forming the output multi-value pixel data, wherein the pixels arranged in the pixel window correspond to the status values which are converted at the status conversion step from the input multi-value pixel data, and includes the target pixel and a predetermined number of the adjacent pixels provided on both sides of the target pixel; and an output data generating step of changing the input data value of the input multi-value pixel data, into the output data value of the target reference look-up table determined at the first reference look-up table determining step to form the output multi-value pixel data, and outputting the output multi-value pixel data for use at the image forming step.

According to one embodiment of the present invention, pixels in vertical lines and diagonal lines in the input multi-value pixel data can be processed with a simple configuration and in an appropriate manner.

BRIEF DESCRIPTION OF THE DRAWINGS

Other objects, features and advantages of the present invention will become more apparent from the following detailed description when read in conjunction with the accompanying drawings, in which:

FIG. 4 illustrates setting examples of a white threshold and a black threshold, and conversion examples of the three statuses (black, white, and halftone);

FIG. 5 illustrates an example of a look-up table determining unit for determining a reference LUT based on status values in a pixel window of 3×1;

FIG. 6 indicates examples of reference LUTs for performing a vertical line thickening process and a vertical line thinning process;

FIG. 10 illustrates a case of thickening a vertical line having a width corresponding to one pixel;

FIG. 18 describes a case of thickening a vertical line of one pixel when the resolutions in the main scanning direction and the sub scanning direction are different;

FIG. 20 describes a case of thinning a vertical line of two pixels;

FIG. 24 illustrates an example of contents of the look-up table in FIG. 22, for cases where the resolutions in the main scanning direction and the sub scanning direction are the same and different.

DETAILED DESCRIPTION OF THE PREFERRED EMBODIMENTS

A description is given, with reference to the accompanying drawings, of embodiments of the present invention. The present invention is not limited to the specifically disclosed embodiments, and variations and modifications may be made without departing from the scope of the present invention.
<Example of Image Forming Apparatus (Digital Copier)>

Figure 1:
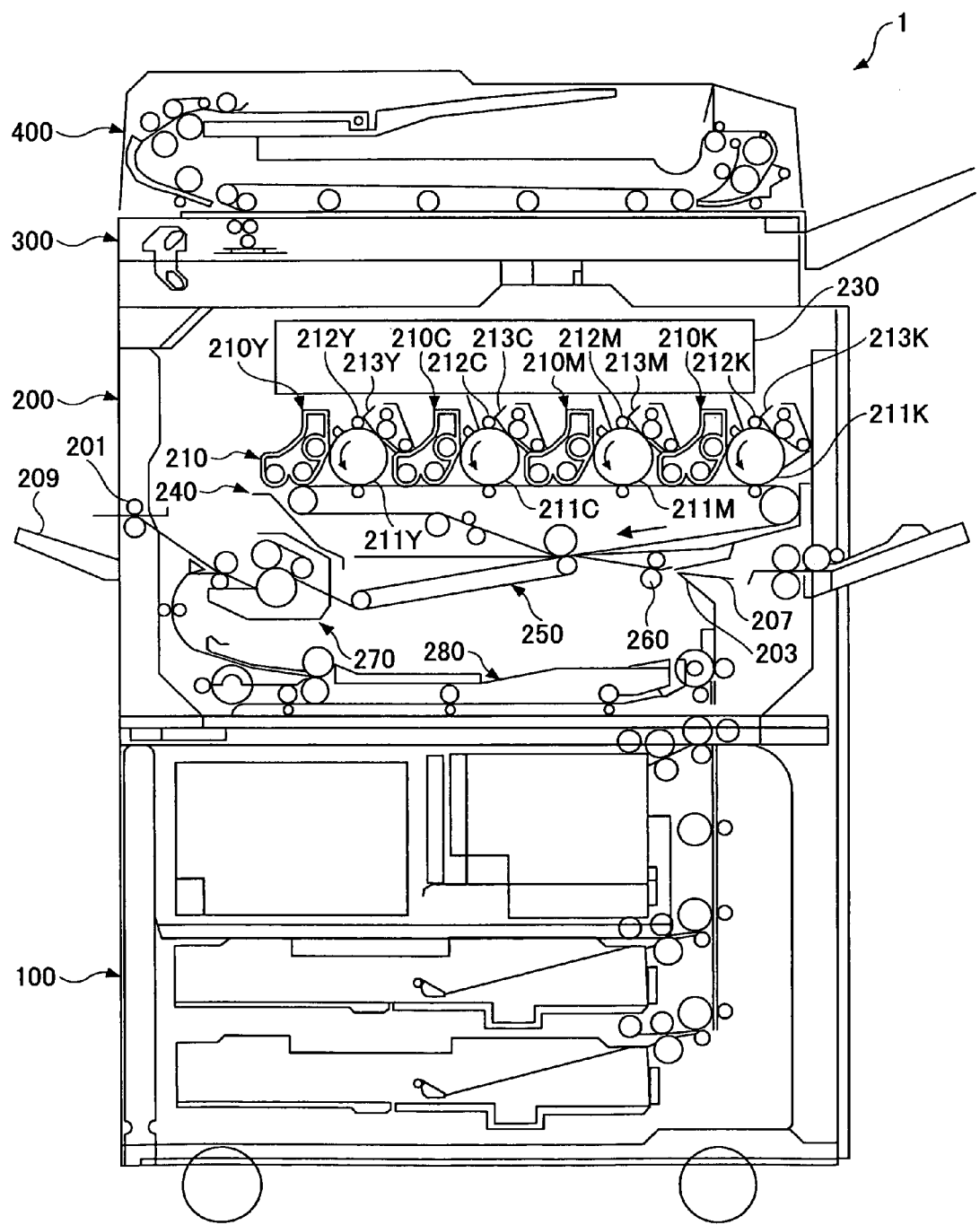
FIG. 1 is a schematic front view of a digital copier to which an image forming apparatus, an image forming method, and an image forming program product according to an embodiment of the present invention is applied.

FIG. 1 is a schematic front view of a digital copier to which an image forming apparatus, an image forming method, and an image forming program product according to an embodiment of the present invention is applied.

As shown in FIG. 1, a digital copier 1 includes a sheet feeding section 100, a printer section 200, and a scanner section 300, which are stacked in this order. On top of the scanner section 300, there is provided an automatic document feeder (hereinafter, "ADF") 400.

The printer section 200 (image forming section) includes an image forming unit 210 provided with four process cartridges 210Y, 210C, 210M, and 210K for forming images in the colors of yellow (Y), magenta (M), cyan (C), and black (K), respectively; an optical writing unit 230; an intermediate transfer unit 240; a secondary transfer unit 250; a resist roller pair 260; a fixing unit 270 employing a belt fixing method; and a sheet inverting unit 280.

As described below, the optical writing unit 230 radiates laser beams, which have been modulated based on the image data of the respective colors, onto the surfaces of photoconductors 211Y, 211C, 211M, and 211K corresponding to the process cartridges of the respective colors. Accordingly, electrostatic latent images corresponding to the respective colors are formed on the photoconductors 211Y, 211C, 211M, and 211K.

The process cartridges 210Y, 210C, 210M, and 210K include the drum-type photoconductors 211Y, 211C, 211M, and 211K, charging units 212Y, 212C, 212M, and 212K, developing units 213Y, 213C, 213M, and 213K, drum cleaning units, and discharging units, respectively.

Each charging unit uniformly charges the surface of the corresponding drum-type photoconductor by rolling, on the photoconductor, a charging roller to which an alternating voltage is applied. The optical writing unit 230 radiates a laser beam, which has been modulated and deflected based on the image data of the corresponding color, onto the charged surface of the photoconductor. Accordingly, electrostatic latent images of the respective colors are formed on the surfaces of the corresponding drum-type photoconductors.

The process cartridges supply toner of the respective colors from developing units onto the corresponding photoconductors having electrostatic latent images formed thereon.

The toner images formed on the photoconductors are transferred onto an intermediate transfer belt by an intermediate transfer process. After the intermediate transfer process, residual toner remaining on the surfaces of the photoconductors is removed by drum cleaning units. As each of the cleaned photoconductors rotates, it is discharged by the discharging unit (not denoted by a reference numeral), and is uniformly charged by the charging unit 212, thereby returning to the initial state to be prepared for the next image forming operation.

In the digital copier 1, a transfer sheet that has been fed into a sheet feeding path 203 or a manual sheet feeding path 207 in the printer section 200, is conveyed through the resist roller pair 260 and a secondary transfer nip, so that a color toner image is transferred onto the transfer sheet by a secondary transfer process. Subsequently, the toner image is fixed onto the transfer sheet by the fixing unit 270, and then the transfer sheet is ejected to the outside of the digital copier 1.

The transfer sheet which has passed through the fixing unit 270 is ejected to the outside of the digital copier 1 through an ejection roller pair 201 and is stacked on a stack unit 209, or conveyed to the sheet inverting unit 280 disposed beneath the fixing unit 270.
<Optical Writing Unit>

Figure 2:
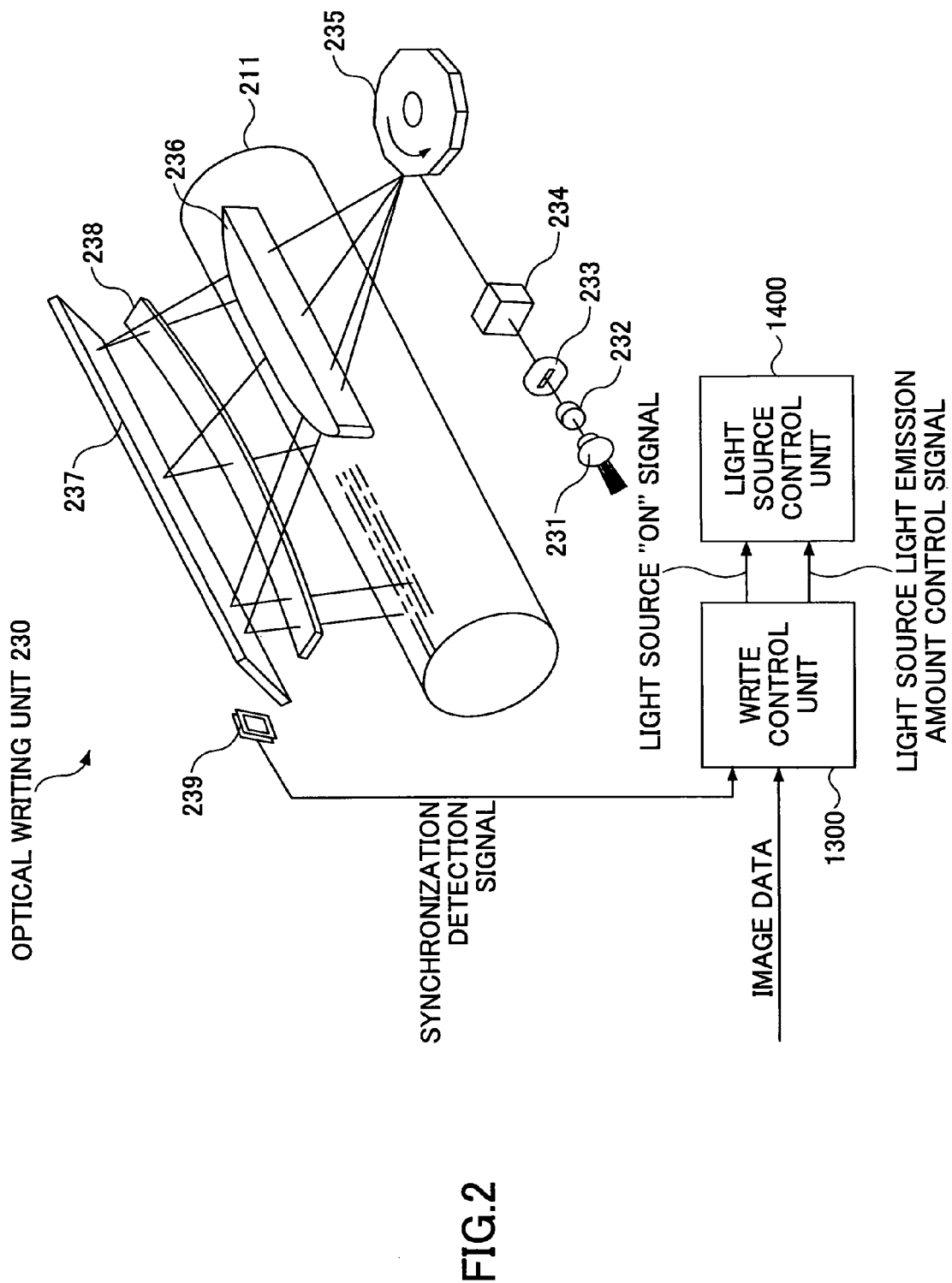
FIG. 2 is a perspective view of an optical writing unit.

Next, a description is given of the optical writing unit 230. FIG. 2 is a perspective view of the optical writing unit. As shown in FIG. 2, the optical writing unit 230 includes an LD (Laser Diode: semiconductor laser) array 231, a collimate lens 232, an aperture 233, a cylindrical lens 234, a polygon mirror 235, a WTL (barrel toroidal lens: optical face tangle error correction lens) 236 for correcting a face tangle error of the polygon mirror 235, a turn-around mirror 237, dust-proof glass 238, and a synchronization detection sensor 239.

The LD array 231 radiates laser beams from plural LDs serving as light emitting sources onto the photoconductors 211 (collectively indicating the photoconductors 211Y, 211C, 211M, and 211K).

The optical writing unit 230 has one optical scanning system shown in FIG. 2 for each of the colors YMCK. The LD array 231 of each color radiates a laser beam, which has been modulated based on the image data of the particular color, onto the corresponding photoconductor 211.

The LD array 231 can include LDs serving as plural light emitting sources arranged in the sub scanning direction, for example. The laser beams radiated from the LD array 231 pass through the collimate lens 232, the aperture 233, and the cylindrical lens 234, so as to be shaped into laser beams of predetermined shapes. Then, the laser beams are radiated onto the polygon mirror 235.

The polygon mirror 235 continuously rotates at a predetermined rotational speed (for example, at a high rotational speed), to reflect (deflect) a laser beam in the direction of the turn-around mirror 237, and to repeatedly scan the laser beam in the main scanning direction (shaft direction of photoconductive drum). The laser beam reflected by the polygon mirror 235 is subjected to optical face tangle error correction by the WTL 236, and is then reflected by the turn-around mirror 237 to a different angle. Finally, the laser beam is imaged as a spot having a predetermined beam spot diameter on the surface of the photoconductor 211.

After the laser beam is reflected by the polygon mirror 235 and before the main scanning operation is performed on the photoconductor 211, the laser beam enters the synchronization detection sensor 239 provided on a side from which the main scanning starts, which is outside the main scanning writing region (outside a predetermined main scanning width) of the surface of the photoconductor 211.

The synchronization detection sensor 239 detects the laser beam, generates a synchronization detection signal, and outputs the synchronization detection signal to a write control unit 1300.

(First Embodiment)

Figure 3:
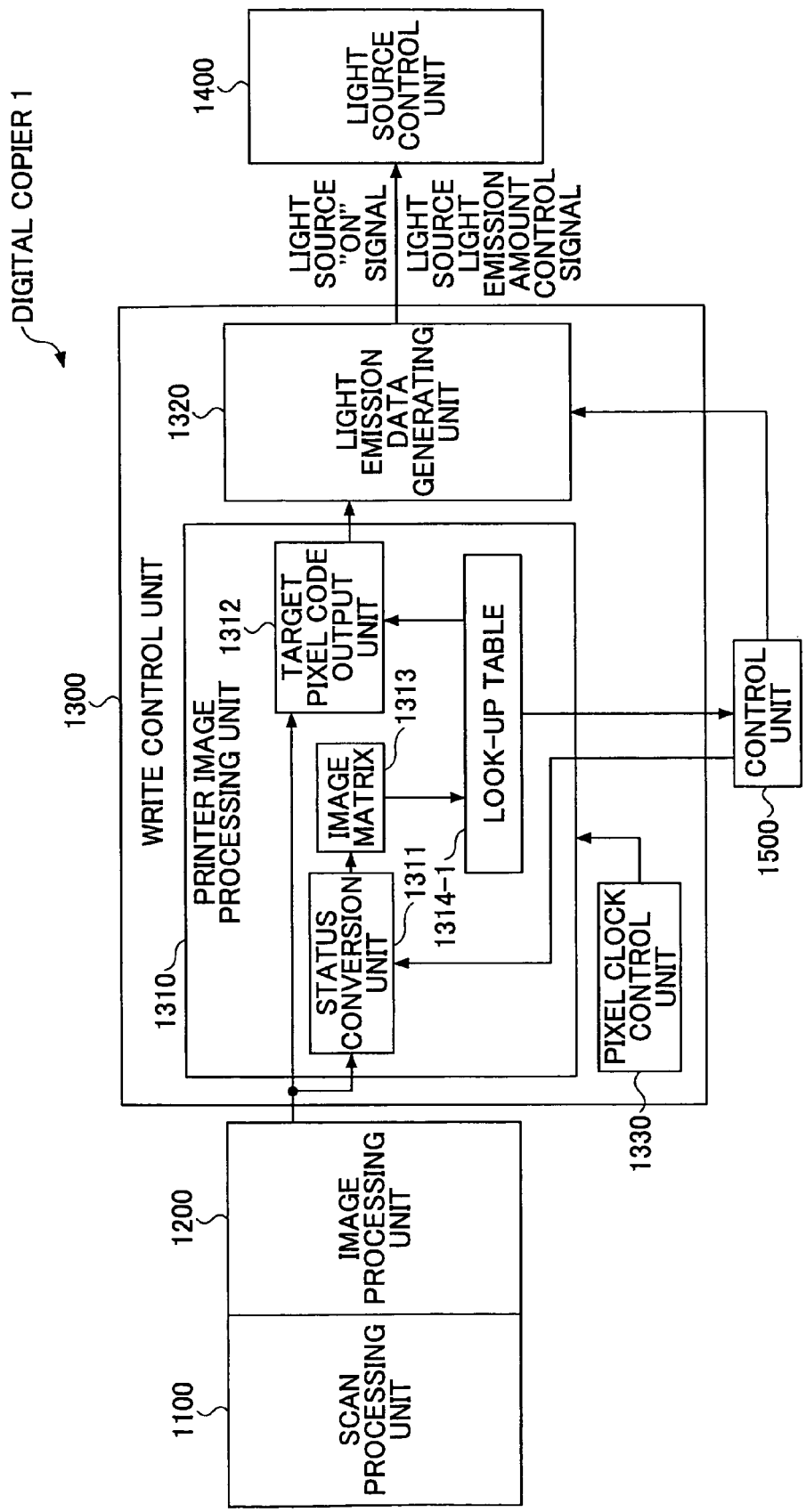
FIG. 3 is a block diagram of a relevant circuit of the digital copier according to a first embodiment of the present invention.

Next, a description is given of a first embodiment according to the present invention. FIG. 3 is a block diagram of a relevant circuit of the digital copier 1 according to the first embodiment. As shown in FIG. 3, the digital copier 1 includes a scan processing unit 1100 for performing data processing for the scanner section 300, an image processing unit 1200, the write control unit 1300 for performing data processing for the printer section 200, a light source control unit 1400, and a control unit 1500 for controlling all units of the digital copier 1.

The scan processing unit 1100 performs, on the analog image data that has undergone photoelectric conversion of the CCD, a process such as a sampling process, an A/D (analog/digital) conversion process, and shading correction for making corrections in a case where the scan data is inconsistent. Then, the scan processing unit 1100 outputs the image data to the image processing unit 1200.

The image processing unit 1200 performs image quality correction processes on the image data, such as a zooming process, a rotating process, and an edge process. Then, the image processing unit 1200 converts the image data into multi-value image data (multi-value pixel data) (for example, of 4 bits/16 values), and outputs the multi-value pixel data to the write control unit 1300.

The control unit 1500 includes a ROM (Read Only Memory), a RAM (Random Access Memory), and a CPU (Central Processing Unit). The CPU controls the entire the digital copier 1 based on programs in the ROM, by using the RAM as a work memory, for example. Accordingly, the CPU controls all operations of the digital copier 1. The hardware configuration of the digital copier 1 is described below.

The write control unit 1300 includes an ASIC (Application Specific Integrated Circuit), with functions of a printer image processing unit 1310, a light emission data generating unit 1320, and a pixel clock control unit 1330.

The scan processing unit 1100 and the image processing unit 1200 may be implemented by the ASIC. The scan processing unit 1100 and the image processing unit 1200 may be implemented by different ASICs or a single ASIC. When the scan processing unit 1100, the image processing unit 1200, and the write control unit 1300 are implemented by a single ASIC, the units may use functions or hardware configurations of one another to execute functions.

The printer image processing unit 1310 includes a status conversion unit 1311, a target pixel code output unit 1312, an image matrix 1313, and a look-up table 1314-1.

The pixel clock control unit 1330 generates a pixel clock which corresponds to the timings for performing process operations on the image data in the write control unit 1300, and outputs the clock to relevant units. The period of the frequency of this pixel clock matches that of the main scanning period for one pixel.

The multi-value pixel data output from the image processing unit 1200 shown in FIG. 3 is input to the target pixel code output unit 1312 and the status conversion unit 1311 of the printer image processing unit 1310.

The status conversion unit 1311 classifies the input multi-value pixel data (multi-value pixel data that is input) into three status values of "white", "black", and "halftone" based on a white threshold (achromatic threshold) and a black threshold (maximum color threshold) set from the control unit 1500, and outputs the classified data to the image matrix 1313.

The status conversion unit 1311 converts input multi-value pixel data having a density value (data value) of, for example 4 bits/16 values (0 through 15), into data having a density value of 2 bits/4 values. In the case of, for example, 4 bits/16 values, the status conversion unit 1311 determines that if the data value were larger, the image data would correspond to a larger toner application amount. That is, the data value of the image data corresponds to the amount of toner to be applied, i.e., the density of the image data (pixel data).

FIG. 4 illustrates setting examples of a white threshold and a black threshold, and conversion examples of the three statuses (black, white, and halftone). As shown in FIG. 4, the achromatic threshold, which is a threshold with which no toner is to be applied (hereinafter referred to as "white threshold" as a matter of simplification), is "1", and the maximum color threshold, which is a threshold with which a maximum amount of toner is to be applied (hereinafter referred to as "black threshold" as a matter of simplification), is "14".

When the input multi-value pixel data has a data value (input data value) of greater than or equal to "14", the status conversion unit 1311 determines that the pixel is a maximum color pixel. Accordingly, the status conversion unit 1311 converts the data into a black status value (maximum color status value) of, for example, (1, 1), and outputs this value to the image matrix 1313.

When the input multi-value pixel data has a data value (input data value) of less than or equal to "1", the status conversion unit 1311 determines that the pixel is an achromatic pixel. Accordingly, the status conversion unit 1311 converts the data into a white status value (achromatic status value) of, for example, (0, 0), and outputs this value to the image matrix 1313.

When the input multi-value pixel data has a data value (input data value) of "2" through "13", the status conversion unit 1311 determines that the pixel is a halftone pixel. Accordingly, the status conversion unit 1311 converts the data into a halftone status value of, for example, (0, 1) or (1, 0), and outputs this value to the image matrix 1313.

In the following description, an achromatic pixel (pixel with no toner to be applied) is referred to as a white pixel, achromatic is referred to as white, and a maximum color pixel (pixel to which a large amount of toner is to be applied) is referred to as a black pixel, and the maximum color is referred to as black. For the sake of simplification, and unless otherwise described, a white pixel means an achromatic pixel, white means achromatic, a black pixel means a maximum color pixel, and black means a maximum color.

The image matrix 1313 generates a pixel window (matrix) of one or more lines, with at least one pixel in the sub scanning direction corresponding to the target pixel which is to be output, and three or more pixels in the main scanning direction including the pixels adjacent to the target pixel (before and behind the target pixel, with the target pixel located in the center).

The image matrix 1313 arranges, in the generated pixel window, the status values of the pixels input from the status conversion unit 1311, and outputs the pixel window to the look-up table 1314-1. A conventional method can be used to generate a window of the image matrix 1313.

For example, in a case of generating a pixel window of three pixels in one line, the image matrix 1313 prepares a flip-flop for three lines, and generates a pixel window in which the status values of three pixels in the main scanning direction are arranged, which are delayed by one pixel each based on the pixel clock from the pixel clock control unit 1330.

As described above, the image matrix 1313 prepares a window of at least one pixel in the sub scanning direction and three pixels in the main scanning direction. However, the size of the window is not limited to one pixel in the sub scanning direction and three pixels in the main scanning direction. The pixel window can have a larger size than this.

To create a larger window, a matrix that is used by the scan processing unit 1100 and the image processing unit 1200, for example, a matrix for an edge highlight process can be used in combination with the image matrix 1313. A process function of another processing unit can be easily used in combination, when the other processing unit is implemented by the same ASIC, for example, when the image processing unit 1200, the scan processing unit 1100, and the write control unit 1300 are implemented with a single ASIC.

The look-up table 1314-1 (first reference look-up table determining unit) determines the reference LUT (target reference look-up table), from among the reference LUTs provided in the look-up table 1314-1, based on the arrangement of the status values in the pixel window input from the image matrix 1313. The look-up table 1314-1 outputs the data value of the determined reference LUT (output data value) to the target pixel code output unit 1312.

FIG. 5 illustrates an example of the look-up table 1314-1 for determining the reference LUT based on the status values in the pixel window of 3×1. As shown in FIG. 5, the look-up table 1314-1 is a table of association between arrangements of the status values (status values of three pixels in the main scanning direction) and the reference LUTs which are to be looked up for the corresponding arrangements of status values.

Based on the arrangement of status values of pixels in the pixel window of the image matrix 1313, the look-up table 1314-1 determines the reference LUT for correcting the input data value of the input image data (input pixel data).

Specifically, the look-up table 1314-1 shown in FIG. 5 is for determining the reference LUT to be used, according to the arrangement of status values, when the image matrix 1313 is a pixel matrix of 3 pixels×1 pixel.

As shown in FIG. 5, when the arrangement of the status values of the pixel matrix of 3 pixels×1 pixel is "○○●", where the leading white pixel is the target pixel in a pixel arrangement that changes from a white pixel to a black pixel, a leading white pixel LUT is set as the reference LUT.

When the arrangement of the status values is "○●●", where the leading black pixel is the target pixel in a pixel arrangement that changes from a white pixel to a black pixel, a leading black pixel LUT is set as the reference LUT.

When the arrangement of the status values is "●○○", where the trailing white pixel is the target pixel in a pixel arrangement that changes from a black pixel to a white pixel, a trailing white pixel LUT is set as the reference LUT. When the arrangement of the status values is "●●○", where the trailing black pixel is the target pixel in a pixel arrangement that changes from a black pixel to a white pixel, a trailing black pixel LUT is set as the reference LUT.

When the arrangement of the status values is "●○●", where the isolated white pixel is the target pixel in a pixel arrangement that changes from a black pixel to a white pixel and then to a black pixel, an isolated white pixel LUT is set as the reference LUT. When the arrangement of the status values is "○●○", where the isolated black pixel is the target pixel in a pixel arrangement that changes from a white pixel to a black pixel and then to a white pixel, an isolated black pixel LUT is set as the reference LUT.

When the arrangement of the status values is "x - - ", " - x - ", or " - - x" (- is an arbitrary pixel and x is a halftone pixel), where a halftone pixel is included in the status values of the pixel arrangement in the pixel window, or when the arrangement of the status values is "●●●" or "○○○", where only black pixels are included or only white pixels are included, "no process" is set, such that the input multi-value pixel data is directly used as the output multi-value pixel data (multi-value pixel data to be output).

FIG. 6 indicates examples of reference LUTs for performing a vertical line thickening process and a vertical line thinning process. As shown in FIG. 6, in the look-up table 1314-1, the output data values of the reference LUTs (isolated black LUT, leading black LUT, trailing black LUT, isolated white LUT, leading white LUT, trailing white LUT) are set for the process for thickening the vertical lines (vertical line thickening process) and the process for thinning the vertical lines (vertical line thinning process).

The output data values of the reference LUTs can be appropriately set by the control unit 1500. As shown in FIG. 6, the output data values are set as follows: in the isolated black LUT, "15" is set for the thickening process and "11" is set for the thinning process; in the leading black LUT, "15" is set for the thickening process and "12" is set for the thinning process; in the trailing black LUT, "15" is set for the thickening process and "13" is set for the thinning process; in the isolated white LUT, "0" is set for the thickening process and "0" is set for the thinning process; in the leading white LUT, "0" is set for the thickening process and "0" is set for the thinning process; and in the trailing white LUT, "4" is set for the thickening process and "0" is set for the thinning process.

In one example, either the reference LUTs for the vertical line thickening process or the reference LUTs for the vertical line thinning process are set in the look-up table 1314-1 in accordance with the features of the digital copier 1.

For example, in the digital copier 1, image data including vertical lines and horizontal lines having the same thickness, is used to form an actual image, and the image is printed out on a transfer sheet. When the vertical lines are thicker than the horizontal lines in the printed image, a correction process may be performed to make the vertical lines thinner so as to match the thickness of the horizontal lines. Conversely, when the vertical lines are thinner than the horizontal lines in the printed image, it is necessary to perform a correction process to make the vertical lines thicker so as to match the thickness of the horizontal lines.

Accordingly, in a case of performing a vertical line thinning process to make the vertical lines thinner, output data values for thinning the vertical lines are provided in the reference LUTs of the look-up table 1314-1, such as those indicated in FIG. 6, as the reference data values for performing a vertical line thinning process.

Furthermore, in a case of performing a vertical line thickening process to make the vertical lines thicker, output data values for thickening the vertical lines are provided in the reference LUTs of the look-up table 1314-1, such as those indicated in FIG. 6 as the reference data values for performing a vertical line thickening process.

As described above, in the digital copier 1, it is possible to appropriately set the white threshold (achromatic threshold) and a black threshold (maximum color threshold) of the status conversion unit 1311, and the output data values of the reference LUTs in the look-up table 1314-1. Thus, in the digital copier 1, when thinning the dot images in the main scanning direction, i.e., when performing a vertical line thinning process of thinning the vertical lines, the output data values and the thresholds are set so as to satisfy the following relationship:

> achromatic reference data value≦white threshold<maximum color reference data value≦black threshold In the digital copier 1, when thickening the dot image in the main scanning direction, i.e., when performing a vertical line thickening process of thickening the vertical lines, the output data values and the thresholds are set so as to satisfy the following relationship:

> white threshold≦achromatic reference data value<black threshold≦maximum color reference data value In correcting the vertical lines, if the lines are simply thinned or thickened, inconsistencies may arise among adjacent pixels, which may lead to degraded image quality. For example, edges of lines or isolated lines can be corrected by simply thinning or thickening the vertical lines. However, in a case where the image has halftone pixels at the edge portions such as in photographs, the image quality may be degraded if the horizontal lines are merely thinned or thickened.

Therefore, as shown in FIG. 5, for cases where halftone pixels are included as the status values of the pixel window, there is a reference LUT included in the look-up table 1314-1 specifying "no process", to use the input original multi-value pixel data as the output multi-value pixel data.

As described above, in the digital copier 1, an appropriate reference LUT is set with output data values corresponding to the actually output image. As described above, the control unit 1500 can appropriately set, in the look-up table 1314-1, the reference LUTs and the output data values of the reference LUTS. Furthermore, the look-up table 1314-1 functions as the first reference look-up table determining unit for determining a reference LUT.

In accordance with an instruction from the look-up table 1314-1, the target pixel code output unit (output data generating unit) 1312 determines the output multi-value pixel data (codes of pixels to be output) from among the input multi-value image data from the image processing unit 1200 or the image data (data values) from the look-up table 1314-1. The target pixel code output unit 1312 outputs the determined multi-value pixel data to the light emission data generating unit 1320.

The light emission data generating unit 1320 generates a light source "on" signal for turning on/off of the LD array 231 and a light source light emission amount control signal for controlling the light amount, based on the multi-value pixel data from the target pixel code output unit 1312 of the printer image processing unit 1310. The light emission data generating unit 1320 outputs the generated signals to the light source control unit 1400.

The light source control unit 1400 turns on/off the LD array 231 and controls the light emission amount of the LD array 231, based on the light source "on" signal and the light source light emission amount control signal from the light emission data generating unit 1320 of the write control unit 1300.

<Hardware Configuration of Digital Copier 1>

Figure 7:
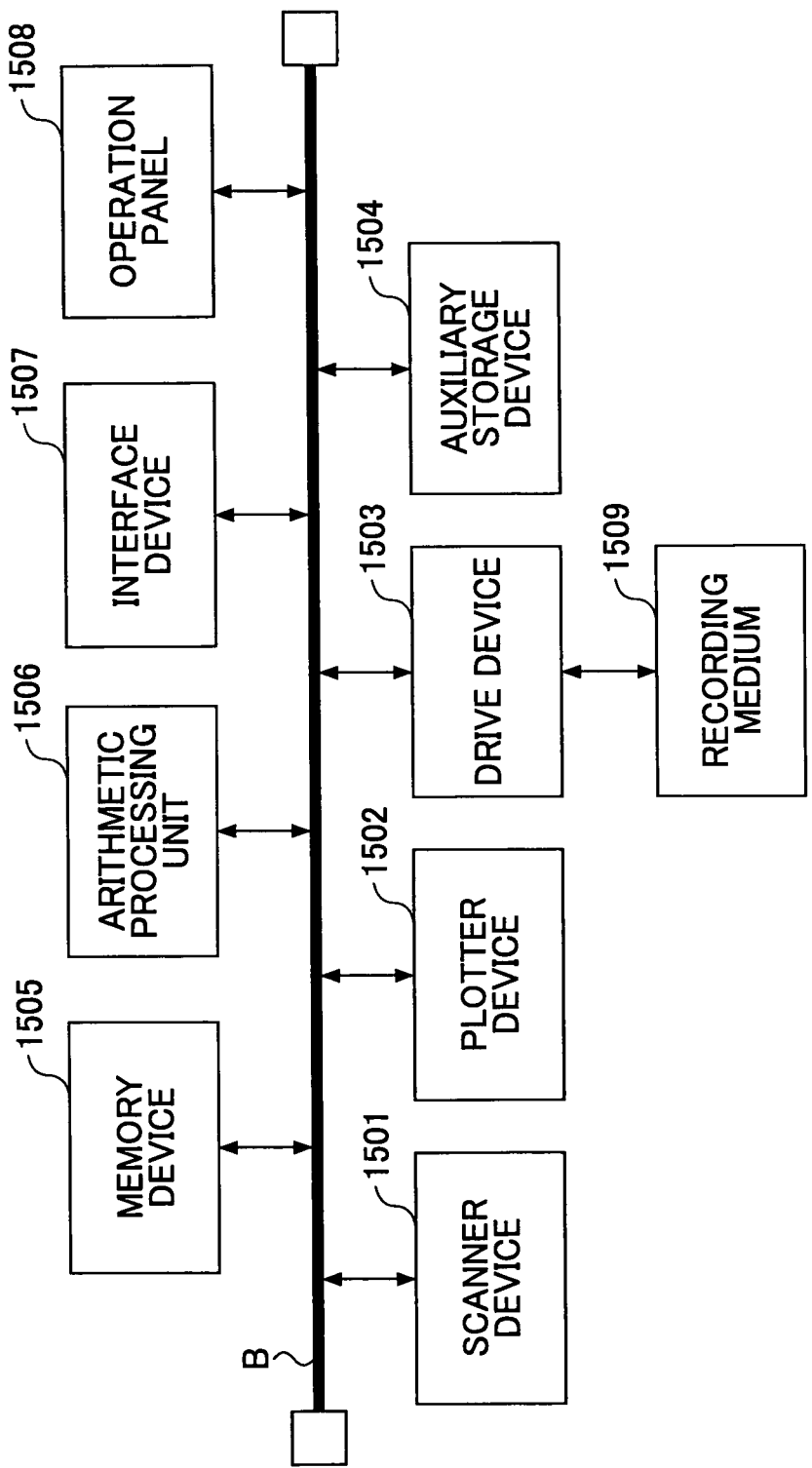
FIG. 7 illustrates an example of a hardware configuration of the digital copier.

A description is given of a hardware configuration of the digital copier 1. FIG. 7 illustrates an example of a hardware configuration of the digital copier 1. The digital copier 1 according to the present embodiment is a multifunction peripheral having plural functions such as a copy function, a scanner function, a fax function, and a printing function.

The digital copier 1 includes a scanner device 1501, a plotter device 1502, a drive device 1503, an auxiliary storage device 1504, a memory device 1505, an arithmetic processing unit 1506, an interface device 1507, and an operation panel 1508, which are interconnected by a bus B.

The scanner device 1501 includes a scanner engine and an engine control unit for controlling the scanner engine, and is used for acquiring image data from a paper original. The plotter device 1502 includes a plotter engine and an engine control unit for controlling the plotter engine, and is used for outputting image data.

The interface device 1507 includes a modem and a LAN card, and is used for connecting the digital copier 1 to a network.

The digital copier 1 exchanges information with other devices in the network via the interface device 1507. The operation panel 1508 includes a touch panel, and displays the operation keys of the digital copier 1 and the status of the process in progress.

The image forming program according to an embodiment of the present invention is at least one of the various programs for controlling the digital copier 1. The image forming program is acquired, for example, from a recording medium 1509 which is distributed, or by downloading the program from the network.

The recording medium 1509 recording the image forming program can be various types of recording media, such as a CD-ROM (Compact Disc Read Only Memory), a flexible disk, a recording medium such as a magneto-optical disc for optically, electrically, or magnetically recording information, and a semiconductor memory such as a ROM and a flash memory for electrically recording information.

When the recording medium 1509 including the image forming program is set in the drive device 1503, the image forming program is installed from the recording medium 1509 to the auxiliary storage device 1504 via the drive device 1503. The image forming program that has been downloaded from the network is installed in the auxiliary storage device 1504 via the interface device 1507.

The auxiliary storage device 1504 stores the image forming program that has been installed, and also stores files and data. The memory device 1505 reads the image forming program from the auxiliary storage device 1504 when the computer is started up, and stores the image forming program. The arithmetic processing unit 1506 implements various processes described below in accordance with the image forming program stored in the memory device 1505.

As described above, the digital copier 1 has a hardware configuration as illustrated for example in FIG. 7, and reads an image forming program for executing the image forming method according to an embodiment of the present invention, from a recording medium readable by the CPU (arithmetic processing unit 1506) of the control unit 1500, such as a ROM, an EEPROM (Electrically Erasable and Programmable Read Only Memory), an EPROM, a flash memory, a flexible disk, a CD-ROM, a CD-RW (Compact Disc Rewritable), a DVD (Digital Video Disk), an SD (Secure Digital) card, and an MO (Magneto-Optical Disc).

In the digital copier 1, the write control unit 1300 includes an ASIC, and therefore, the widths of the vertical lines can be efficiently controlled as described below, and the image forming method can be executed appropriately.

The image forming program described above is a computer-executable program which is described in for example legacy programming languages or object oriented programming languages such as assembler, C, C++, C#, Java (registered trademark). The image forming program can be stored in the above recording medium to be distributed.

<Functions of First Embodiment>

A description is given of a function of the first embodiment. The digital copier 1 according to the first embodiment performs an image forming process of appropriately determining the vertical lines and adjusting the thicknesses according to settings.

The digital copier 1 inputs the analog image data that has undergone photoelectric conversion of the CCD of the scanner section 300, into the scan processing unit 1100. The scan processing unit 1100 performs processes such as a sampling process, an A/D conversion process, and a shading correction process, and outputs the image data to the image processing unit 1200.

The image processing unit 1200 of the scanner section 300 performs image quality correction processes on the image data, such as a zooming process, a rotating process, and an edge process. Then, the image processing unit 1200 converts the image data into multi-value pixel data (for example, of 4 bits/16 values), and outputs the multi-value pixel data to the write control unit 1300.

In the write control unit 1300, the light emission data generating unit 1320 generates a light source "on" signal for turning on/off of the LD array 231 and a light source light emission amount control signal for controlling the light amount, based on the multi-value pixel data from the image processing unit 1200. Then, the light emission data generating unit 1320 of the write control unit 1300 outputs the generated signals to the light source control unit 1400.

The light source control unit 1400 turns on/off the LD array 231 and controls the light emission amount of the LD array 231, based on the light source "on" signal and the light source light emission amount control signal from the light emission data generating unit 1320 of the write control unit 1300.

In the printer section 200 of the digital copier 1, the LD array 231 of each color is turned on to form an electrostatic latent image on the corresponding photoconductor 211 (211Y, 211C, 211M, and 211K). Then, a developing process, a transfer process, and a fixing process are performed, so that a color toner image is formed on a transfer sheet.

However, as described above, the digital copier 1 has a characteristic that even if the same multi-value pixel data was input, the vertical lines and the horizontal lines formed on transfer sheets may vary.

For example, when a vertical line is formed by turning on the LD array 231 for a period of time corresponding to one pixel line in the main scanning direction, a light beam is radiated from the LD array 231 for a period of time corresponding to one pixel line. However, depending on the beam spot diameter and developing conditions, the thickness of the vertical line of the toner image formed on the transfer sheet may become different from the ideal thickness of a line of one pixel.

When the digital copier 1 according to the present embodiment has a characteristic that the vertical lines become thinner than the horizontal lines, a vertical line thickening process is performed for thickening the vertical lines. When the digital copier 1 has a characteristic that the vertical lines become thicker than the horizontal lines, a vertical line thinning process is performed for thinning the vertical lines. For the purpose of increasing the processing speed and making a simple, small-scale configuration, the multi-value pixel data is converted into the three statuses of a white pixel, a black pixel, or a halftone pixel.

In the digital copier 1, the look-up table 1314-1 determines the status of an image (according to the three statuses of the pixels) based on the arrangement of status values in a pixel window of the image matrix 1313 of for example at least three pixels in the main scanning direction and one pixel in the sub scanning direction. The digital copier 1 determines the reference LUT based on the determination results obtained via the look-up table 1314-1, and determines whether to perform a vertical line thickening process, a vertical line thinning process, or "no process". As described above, the input multi-value pixel data is corrected according to need. Then, the light emission data generating unit 1320 generates a light source "on" signal and a light source light emission amount control signal.

The digital copier 1 has the printer image processing unit 1310 provided in the write control unit 1300. The multi-value pixel data input from the image processing unit 1200 of the scanner section 300 is input to the target pixel code output unit 1312 of the printer image processing unit 1310, and is also input to the status conversion unit 1311.

In the digital copier 1, the status conversion unit 1311 classifies the input multi-value pixel data into the three statuses of "white", "black", and "halftone" (three kinds of status values) based on the white threshold and the black threshold set by the control unit 1500, and outputs the data to the image matrix 1313.

The image matrix 1313 generates a pixel window of one or more lines, including at least one pixel in the sub scanning direction corresponding to the target pixel which is to be output, and three or more pixels in the main scanning direction including the pixels adjacent to the target pixel (before and behind the target pixel). The image matrix 1313 arranges, in the generated pixel window, the status values of the pixels input from the status conversion unit 1311, and outputs the pixel window to the look-up table 1314-1.

The look-up table 1314-1 determines the reference LUT based on the arrangement of status values of the three statuses in a pixel window input from the image matrix 1313, as shown in FIG. 5, for example. Then, the look-up table 1314-1 outputs the data value of the determined reference LUT (see FIG. 6) to the target pixel code output unit 1312.

Figure 8:
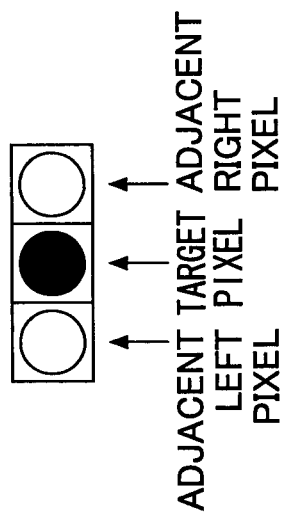
FIG. 8 illustrates an example of input multi-value pixel data, three kinds of status values, and the pixel window.

For example, FIG. 8 illustrates an example of the input multi-value pixel data, the three kinds of status values, and the pixel window. For example, the input multi-value pixel data as shown in FIG. 8 is converted into the three kinds of status values by the status conversion unit 1311, the status values are arranged in a pixel window of three pixels in the main scanning direction at the image matrix 1313, and the pixel window is input to the look-up table 1314-1. The look-up table 1314-1 determines that the center pixel in the pixel window is the target pixel, and determines the reference LUT based on the status values of the target pixel and the pixels adjacent to the target pixel on the left and right.

FIG. 8 illustrates a case where the input multi-value pixel data is expressed in multi-value/4 bits, the black threshold is "14", and the white threshold is "1". The image matrix 1313 generates a pixel window by acquiring the status values corresponding to pixels of white/black/white (○●○), and the pixel window is input to the look-up table 1314-1.

When the status values in the arrangement in the pixel window shown in FIG. 8 are input to the look-up table 1314-1, the isolated black pixel LUT is determined as the reference LUT, with reference to FIG. 5. Furthermore, as shown in FIG. 6, in the isolated black pixel LUT, "15" is set as the data value for the vertical line thickening process, and "11" is set as the data value for the vertical line thinning process.

As shown in FIG. 8, when the data value of the target pixel in the input multi-value pixel data is "14", and the black threshold is "14", the status conversion unit 1311 converts the pixel value into a black status value.

The look-up table 1314-1 determines that the isolated black pixel LUT is to be referred to for the target pixel converted into a black status value. In the isolated black pixel LUT, "15" is set as the data value for the vertical line thickening process. Therefore, the look-up table 1314-1 outputs an output data value ("15" in this example) of the reference LUT to the target pixel code output unit 1312.

In accordance with an instruction from the look-up table 1314-1, the target pixel code output unit 1312 determines the output multi-value pixel data to be output (codes of pixels to be output) from among the input multi-value pixel data from the image processing unit 1200 or the data values from the look-up table 1314-1. The target pixel code output unit 1312 outputs the determined output multi-value pixel data to the light emission data generating unit 1320.

The light emission data generating unit 1320 generates a light source "on" signal for turning on/off of the LD array 231 and a light source light emission amount control signal for controlling the light amount, based on the multi-value pixel data from the target pixel code output unit 1312 of the printer image processing unit 1310. The light emission data generating unit 1320 outputs the generated signals to the light source control unit 1400.

The light source control unit 1400 turns on/off the LD array 231 and controls the light emission amount of the LD array 231, based on the light source "on" signal and the light source light emission amount control signal from the light emission data generating unit 1320 of the write control unit 1300.

In the example shown in FIG. 8, when data values for the vertical line thickening process are set in the reference LUTs shown in FIG. 6, the look-up table 1314-1 determines the multi-value pixel data having a data value of "15" as the multi-value pixel data to be output. When data values for the vertical line thinning process are set in the reference LUTs shown in FIG. 6, the look-up table 1314-1 determines the multi-value pixel data having a data value of "11" as the multi-value pixel data to be output.

Accordingly, when data values for the vertical line thickening process are set as data values in the reference LUTs, the vertical line can be thickened. When data values for the vertical line thinning process are set as data values in the reference LUTs, the vertical line can be thinned.

Figure 9:
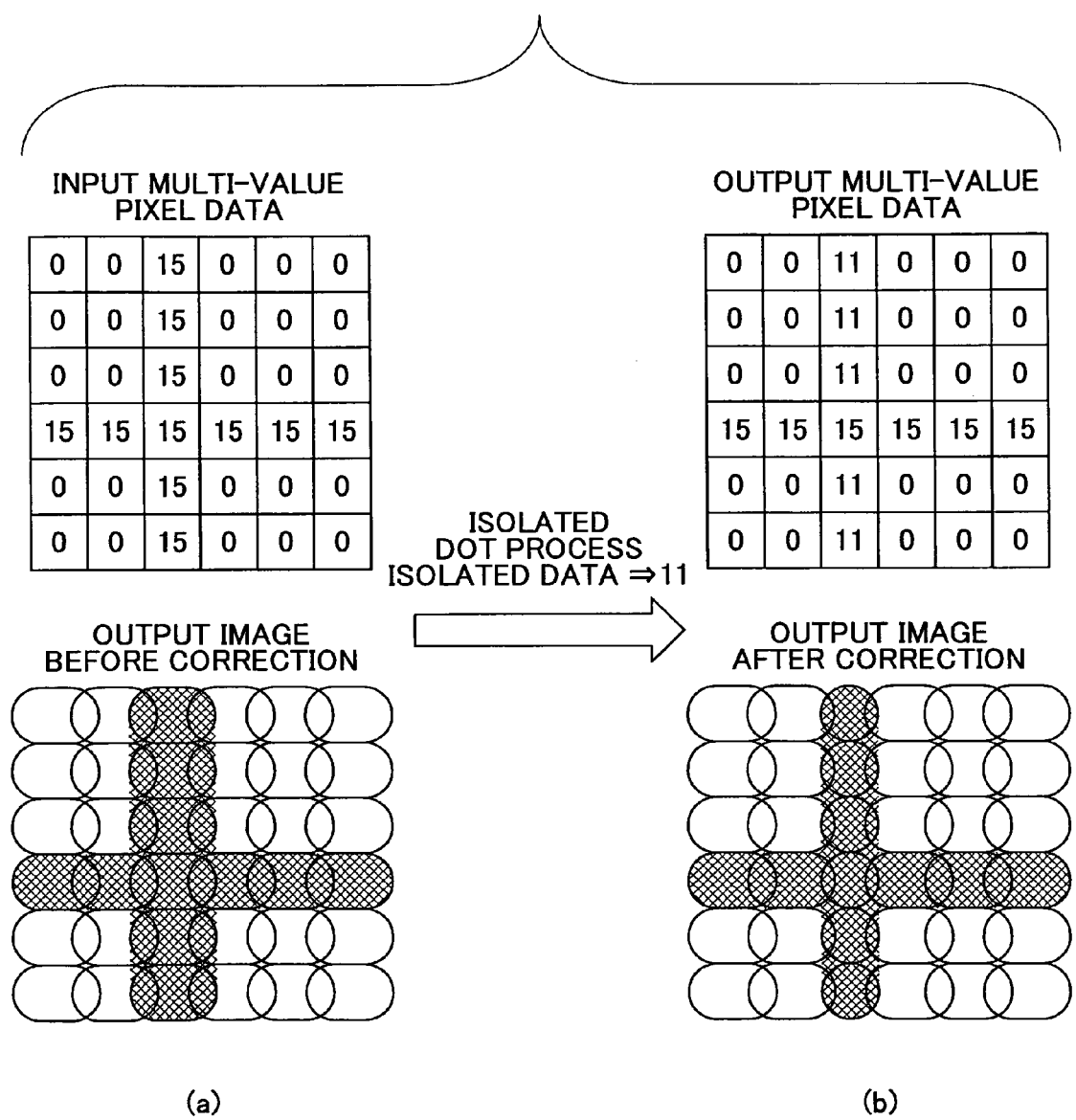
FIG. 9 illustrates a case of thinning a vertical line having a width corresponding to one pixel.

FIG. 9 illustrates a case of thinning a vertical line having a width corresponding to one pixel. A description is given of an example where a vertical line is thicker in the image output by the digital copier 1, compared to that of the original image.

As shown in FIG. 9 (*a*), the vertical line having a width corresponding to one pixel has a data value of "15" in the input multi-value pixel data. In the look-up table 1314-1, data values for the vertical line thinning process are set in the reference LUTs in FIG. 6. The look-up table 1314-1 determines the isolated black pixel LUT as the reference LUT. Multi-value pixel data corresponding to a data value "11" set in the isolated black pixel LUT as shown in FIG. 6 is determined as the multi-value pixel data to be output.

Accordingly, the output image before correction shown in FIG. 9 (*a*) can be corrected into the output image after correction shown in FIG. 9 (*b*), by thinning the vertical line.

Next, a description is given of an example where a vertical line is thinner in the image output by the digital copier 1, compared to that of the original image. FIG. 10 illustrates a case of thickening a vertical line having a width corresponding to one pixel. As shown in FIG. 10 (*a*), the vertical line having a width corresponding to one pixel has a data value of "15" in the input multi-value pixel data. In the look-up table 1314-1, data values for the vertical line thickening process are set in the reference LUTs as shown in FIG. 6.

The look-up table 1314-1 determines the trailing white pixel LUT as the reference LUT, including status values with a trailing white pixel (●○○). Multi-value pixel data corresponding to a data value "4" set in the trailing white pixel LUT in FIG. 6 is determined as the multi-value pixel data to be output. Accordingly, the output image before correction shown in FIG. 10 (*a*) can be corrected into the output image after correction shown in FIG. 10 (*b*), by adding, to the vertical line before correction, a vertical line formed by lighting the LD array 231 for a period of time corresponding to "4", thereby thickening the vertical line.

In the case of thickening the vertical line, when the input multi-value pixel data is expressed in multi-value/4 bits, the black threshold is "14", and the input multi-value pixel data is "14" or more, the status conversion unit 1311 converts this pixel into a black pixel. When the white threshold is "1", and the input multi-value pixel data is "1" or less, the status conversion unit 1311 converts this pixel into a white pixel.

The image matrix 1313 outputs a pixel window having a status arrangement of black/white/white (●○○) to the look-up table 1314-1. The look-up table 1314-1 determines the reference LUT for the vertical line thickening process in which the data value is set at "2" or more, as the reference LUT of the white pixel at the center of the pixel window, and uses the data value of the determined reference LUT. Accordingly, the vertical line can be thickened as shown in FIG. 10 (*b*).

The look-up table 1314-1 may determine the reference LUT for the vertical line thickening process in which the data value is set at "2" or more, as the reference LUT of the white pixel at the center of the arrangement of white/white/black (○○●), and use the data value of the determined reference LUT.

In the case of correcting a vertical line having a width corresponding to plural pixels, the vertical line thickening process or the vertical line thinning process can be performed by determining to use reference LUTs for plural pixels in the look-up table 1314-1, and setting data values for the vertical line thickening process or data values for the vertical line thinning process as the reference LUTs.

Figure 11:
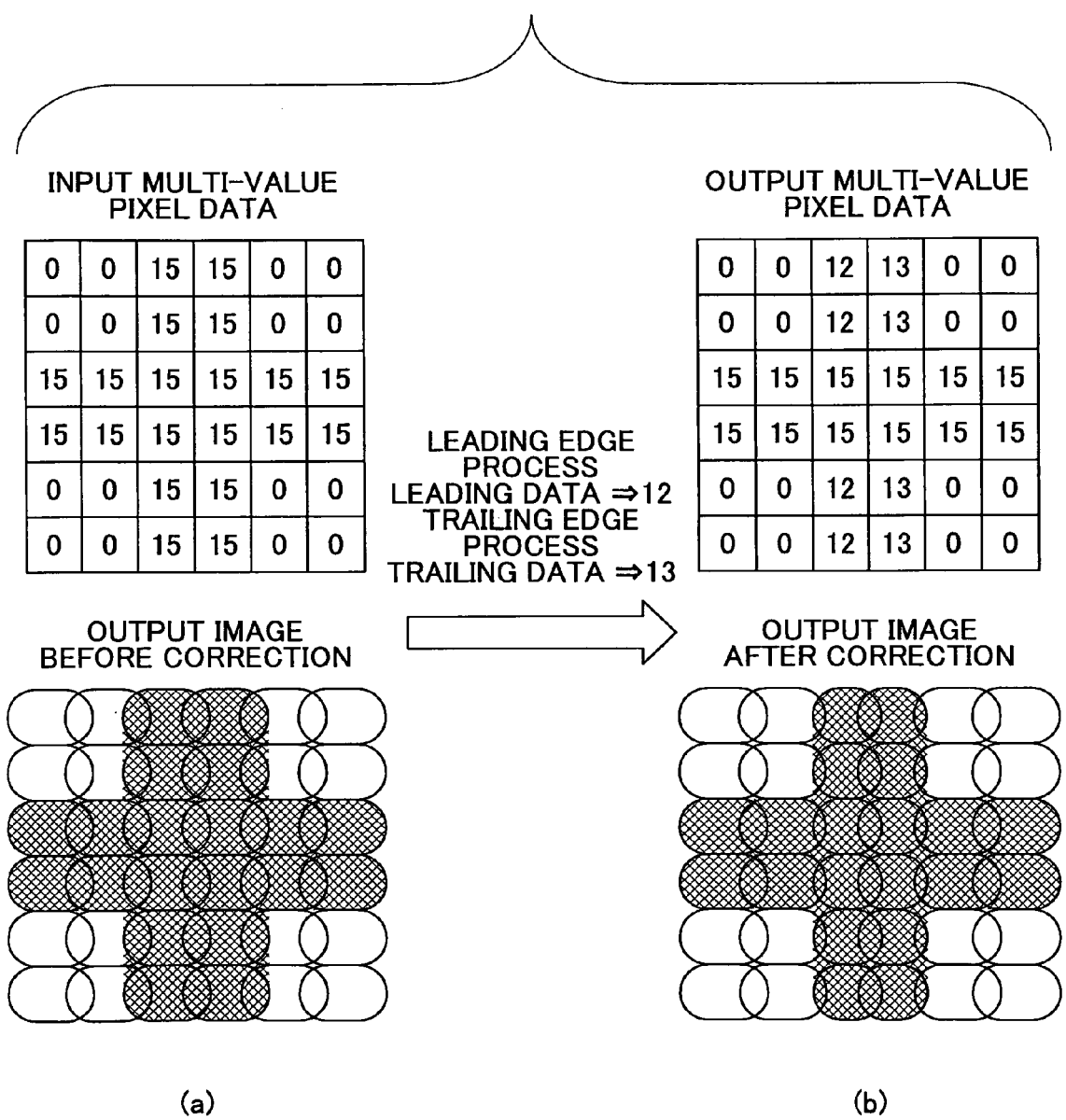
FIG. 11 illustrates a case of thinning a vertical line having a width corresponding to two pixels.

FIG. 11 illustrates a case of thinning a vertical line having a width corresponding to two pixels (vertical line of two pixels). In FIG. 11 (*a*), when the black threshold is "14" and the input multi-value pixel data is "14" or more, the status conversion unit 1311 converts the pixel into a black pixel. When the white threshold is "1" and the input multi-value pixel data is "1" or less, the status conversion unit 1311 converts the pixel into a white pixel.

As shown in FIG. 11 (*a*), when the vertical line corresponds to a width of two pixels, and the vertical line is thicker in the output image than in the original image, data values for the vertical line thinning process are set in the reference LUTs of the look-up table 1314-1.

Therefore, the look-up table 1314-1 determines, as the reference LUT, the leading black pixel LUT corresponding to the status value arrangement of a leading black pixel (○●●), and determines the data value "12" set in the leading black pixel LUT in FIG. 6 as the multi-value pixel data to be output.

Furthermore, the look-up table 1314-1 determines, as the reference LUT, the trailing black pixel LUT corresponding to the status value arrangement of a trailing black pixel (●●○), and determines the data value "13" set in the trailing black pixel LUT in FIG. 6 as the multi-value pixel data to be output.

Accordingly, the output image before correction shown in FIG. 11 (*a*) can be corrected into the output image after correction shown in FIG. 11 (*b*), by changing the vertical line of two pixels corresponding to data values of "15" before correction, into a vertical line of two pixels with data values of "12" and "13" after correction, thereby thinning the vertical line.

Furthermore, the same process as above can be performed for thickening a vertical line in a case where the output vertical line having a width corresponding to plural pixels in the main scanning direction is thinner than the original image.

When there is a "halftone" status value in the pixel window from the image matrix 1313, there may be cases where the target pixel is not at a point where the color changes between black and white, or not at the edge of the vertical line. In such a case, if a reference LUT is applied to the target pixel, the output image may be degraded unintentionally.

Therefore, when there is a "halftone" status value in the pixel window from the image matrix 1313, as shown in FIG. 5, the look-up table 1314-1 does not specify a reference LUT, and determines that "no process" is to be performed so that the input multi-value pixel data is directly output as the output multi-value pixel data.

When the status values in the pixel window are either all black or all white, i.e., black/black/black (●●●) or white/white (○○○), the target pixel is not at a point where the color changes between black and white. Accordingly, when the status values of the pixel window from the image matrix 1313 are either black/black/black (●●●) or white/white (○○○), as shown in FIG. 5, the look-up table 1314-1 does not specify a reference LUT, and determines that "no process" is to be performed so that the input multi-value pixel data is directly output as the output multi-value pixel data.

As described above, in the digital copier 1 according to the present embodiment, the status conversion unit 1311 converts the multi-value pixel data into at least three kinds of status values, i.e., white (achromatic), black (maximum color), and halftone.

The digital copier 1 determines the reference LUT to be referred to based on status values of the target pixel and pixels adjacent to the target pixel in the pixel window, from among the plural reference LUTs (reference look-up tables) including data values of the output multi-value pixel data. The reference LUTs are provided in the look-up table 1314-1 in association with arrangements of status values of pixels in a pixel window including a target pixel and a predetermined number of adjacent pixels on both sides of the target pixel. The input multi-value pixel data is converted into the three kinds of status values which are arranged in the pixel window, and the pixel window is output from the image matrix 1313 to the look-up table 1314-1.

The digital copier 1 converts the data value of the input multi-value pixel data into the data value of the determined reference LUT to obtain output multi-value pixel data, outputs the output multi-value pixel data to the light emission data generating unit 1320, and forms a dot image based on the output multi-value pixel data.

Accordingly, the vertical lines in the input multi-value pixel data can be evaluated with a simple configuration and with high precision, and an appropriate pixel process can be performed on the pixels such as making the vertical lines and the horizontal lines have the same thickness, thereby improving image quality at low cost.

In the digital copier 1 according to the present embodiment, the look-up table 1314-1 determines the reference LUT based on the arrangement of pixel status values in a pixel window including three or more pixels in the main scanning direction and one or more pixels in the sub scanning direction.

Accordingly, the vertical lines can be evaluated with high precision, with an even simpler configuration, and at even lower cost, and an appropriate pixel process can be performed on the pixels such as making the vertical lines and the horizontal lines have the same thickness, thereby improving image quality at even lower cost.

In the digital copier 1 according to the present embodiment, when a halftone status value is included in the pixel window, the look-up table 1314-1 does not determine a reference LUT. When the look-up table 1314-1 does not determine a reference LUT, the target pixel code output unit 1312 outputs the input multi-value pixel data as the output multi-value pixel data, to the light emission data generating unit 1320.

Thus, it is possible to prevent a situation where a reference LUT is applied to a target pixel when the target pixel is not at a point where the color changes between black and white, or not at the edge of the vertical line, and consequently degrading the output image unintentionally. Accordingly, the image quality can be improved even more.

Furthermore, in the digital copier 1 according to the present embodiment, when the status values of the pixels in the pixel window are all the same color (either all white or all black), the look-up table 1314-1 does not determine a reference LUT, and the target pixel code output unit 1312 outputs the input multi-value pixel data as the output multi-value pixel data, to the light emission data generating unit 1320.

Thus, it is possible to prevent a situation where a reference LUT is applied to a target pixel when the target pixel is not at a point where the color changes between black and white, or not at the edge of the vertical line, and consequently degrading the output image unintentionally. Accordingly, the image quality can be improved even more.

In the digital copier 1 according to the present embodiment, the white threshold and the black threshold of the status conversion unit 1311, and the data values in the reference LUTs in the look-up table 1314-1 can be appropriately set. Accordingly, in the digital copier 1, when thinning the formed dot image in the main scanning direction, the white reference data value provided in a white reference LUT which is referred to when the target pixel is white, the black reference data value provided in a black reference LUT which is referred to when the target pixel is black, the white threshold, and the black threshold are set so as to satisfy the following relationship:

$$\text{white reference data value} \leq \text{white threshold} < \text{black reference data value} \leq \text{black threshold}$$

Therefore, when a vertical line becomes thick in the formed image, the digital copier 1 can perform a process for appropriately thinning the line, and the image can be appropriately corrected in accordance with properties of the digital copier 1, thereby improving the image quality.

In the digital copier 1 according to the present embodiment, when thickening the formed dot image in the main scanning direction, the white reference data value provided in a white reference LUT which is referred to when the target pixel is white, the black reference data value provided in a black reference LUT which is referred to when the target pixel is black, the white threshold, and the black threshold are set so as to satisfy the following relationship:

$$\text{white threshold} \leq \text{white reference data value} < \text{black threshold} \leq \text{black reference data value}$$

Therefore, when a vertical line becomes thin in the formed image, the digital copier 1 can perform a process for appropriately thickening the line, and the image can be appropriately corrected in accordance with properties of the digital copier 1, thereby improving the image quality.

The digital copier 1 according to the present embodiment controls the light radiated on the photoconductors 211Y, 211C, 211M, and 211K based on the multi-value pixel data to form electrostatic latent images corresponding to dots, develops the electrostatic latent images with a developer to form a developer image, and transfers the developer image onto a transfer sheet which is a recording medium, thereby forming an image.

Accordingly, when forming images by the electrophotographic method, the image quality can be improved with an appropriate and simple configuration.

The first embodiment is applied to the digital copier 1 which forms dot images by the electrophotographic method. However, even in a case where other image forming methods are used to form images, such as the case of forming dot images by the ink-jetting method, the widths of vertical lines can be corrected by, for example, adjusting the amount of ink jetted each time.

<Second Embodiment>

Figure 12:
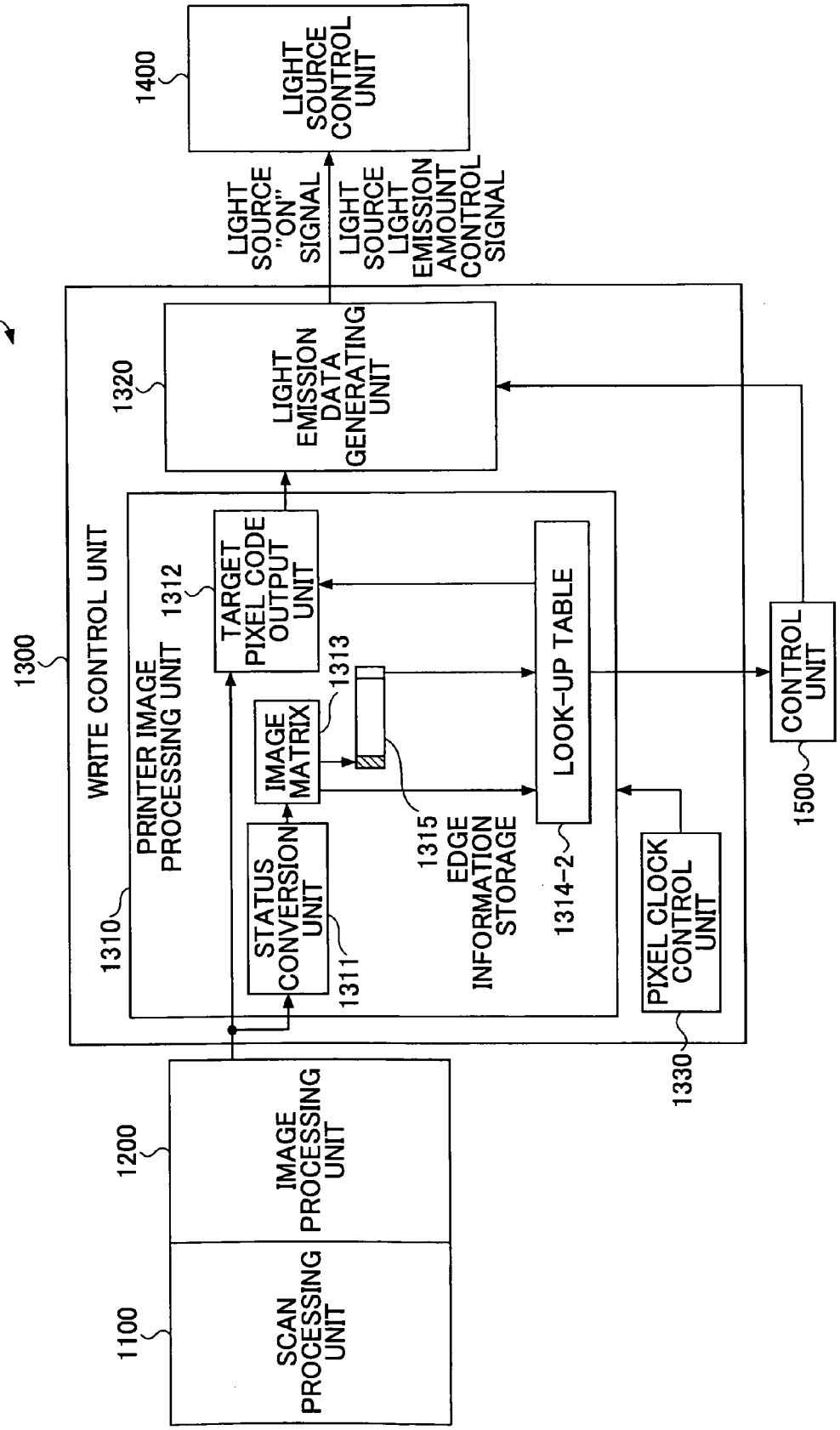
FIG. 12 is a block diagram of a relevant circuit of a digital copier according to a second embodiment of the present invention.

Next, a description is given of a second embodiment of the present invention. FIG. 12 is a block diagram of a relevant circuit of a digital copier 2 according to the second embodiment. In FIG. 12, elements corresponding to those in FIG. 3 are denoted by the same reference numbers, and are not further described.

The image matrix 1313 in the digital copier 2 shown in FIG. 12 generates a pixel window (matrix) of one or more lines, with at least one pixel in the sub scanning direction corresponding to the target pixel which is to be output, and three or more pixels in the main scanning direction including the pixels adjacent to the target pixel (before and behind the target pixel, with the target pixel located in the center).

The image matrix 1313 arranges, in the generated pixel window, the status values of the pixels input from the status conversion unit 1311, makes evaluations as to whether the pixel is at the edge portion of an image or the pixel is in an isolated line, and outputs the pixel window to a look-up table 1314-2. Additionally, the image matrix 1313 generates edge information indicating whether the pixel is at the edge portion of an image or the pixel is in an isolated line, and outputs the edge information to an edge information storage 1315.

For example, the edge information indicates "1" if the pixel is at an edge portion, and if not, the edge information indicates "0". In the case where the arrangement is white/black/white (○●○), white/black/black (○●●), or black/black/white (●●○), it is determined that the pixel is at an edge portion, and the edge information indicates "1".

The look-up table 1314-2 determines the reference LUT with respect to the arrangement of the status values in a pixel matrix of 3 pixels×1 pixel in the image matrix 1313. In this example, the look-up table 1314-2 has reference LUTs (reference LUT values) set in association with arrangements of status values when the edge information is "1" and when the edge information is "0", in both cases of main:sub=1:1 and main:sub=2:1.

Figure 13:
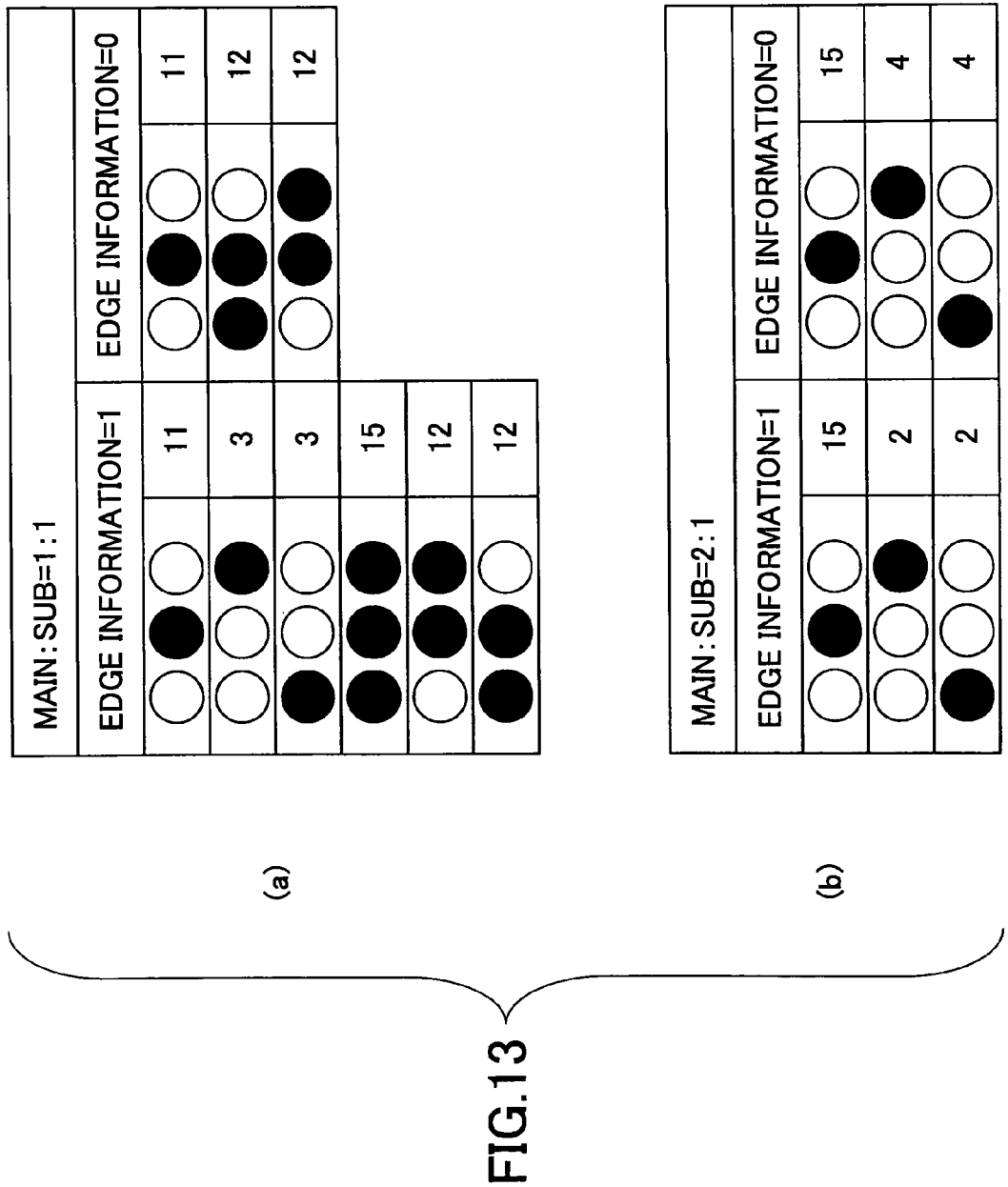
FIG. 13 indicates an example of the look-up table shown in FIG. 12, including a table for when the resolutions in the main scanning direction and the sub scanning direction are the same, and a table for when the resolutions in the main scanning direction and the sub scanning direction are different.

FIG. 13 indicates an example of the look-up table shown in FIG. 12, including a table for when the resolutions in the main scanning direction and the sub scanning direction are the same (same ratio, for example, 1:1), and a table for when the resolutions in the main scanning direction and the sub scanning direction are different (different ratio, for example, 2:1). As shown in FIG. 13, in the look-up table 1314-2 (second reference look-up table determining unit), there is a table of association between the arrangements of the status values (status values of three pixels in the main scanning direction) and the reference LUTs which are to be looked up for the corresponding arrangements of status values; such a table is provided for both edge information items "1" and "0".

Furthermore, as shown in FIG. 13, the look-up table 1314-2 includes tables for both cases of main:sub=1:1 and main:sub=2:1.

The look-up table 1314-2 determines the arrangement of the status values (arrangement of status values of pixels) in the pixel window of the image matrix 1313, and the reference LUT (reference LUT value) for correcting the data value of the input multi-value image data (input multi-value pixel data) according to the edge information.

In the digital copier 2 according to the present embodiment, the white threshold and the black threshold of the status conversion unit 1311, and the data values in the reference LUTs in the look-up table 1314-2 can be appropriately set.

In the digital copier 2, when thinning the dot image in the main scanning direction, i.e., when performing a line thinning process of thinning the line, and when pixels are added to adjacent pixels, the data values and thresholds are set to satisfy the following relationship, where the pixel value of the added pixel is the added pixel value, and the pixel value determined by the reference LUT of the target pixel which is an edge pixel is a thinning pixel value:

added pixel value≦black threshold (maximum color threshold)−black reference LUT (thinning pixel value)

As described above, in correcting vertical lines and diagonal lines, if the lines are simply thinned or thickened, inconsistencies may arise among adjacent pixels, which may lead to degraded image quality. For example, diagonal lines, the edges of lines, or isolated lines can be corrected by simply thinning or thickening the lines. However, in a case where the image has halftone pixels at the edge portions such as in photographs, the image quality may be degraded if the horizontal lines are simply thinned or thickened.

The image matrix 1313 evaluates the pixel data to determine whether it is an isolated dot or at an edge portion, and stores edge information in the edge information storage 1315.

Figure 14:
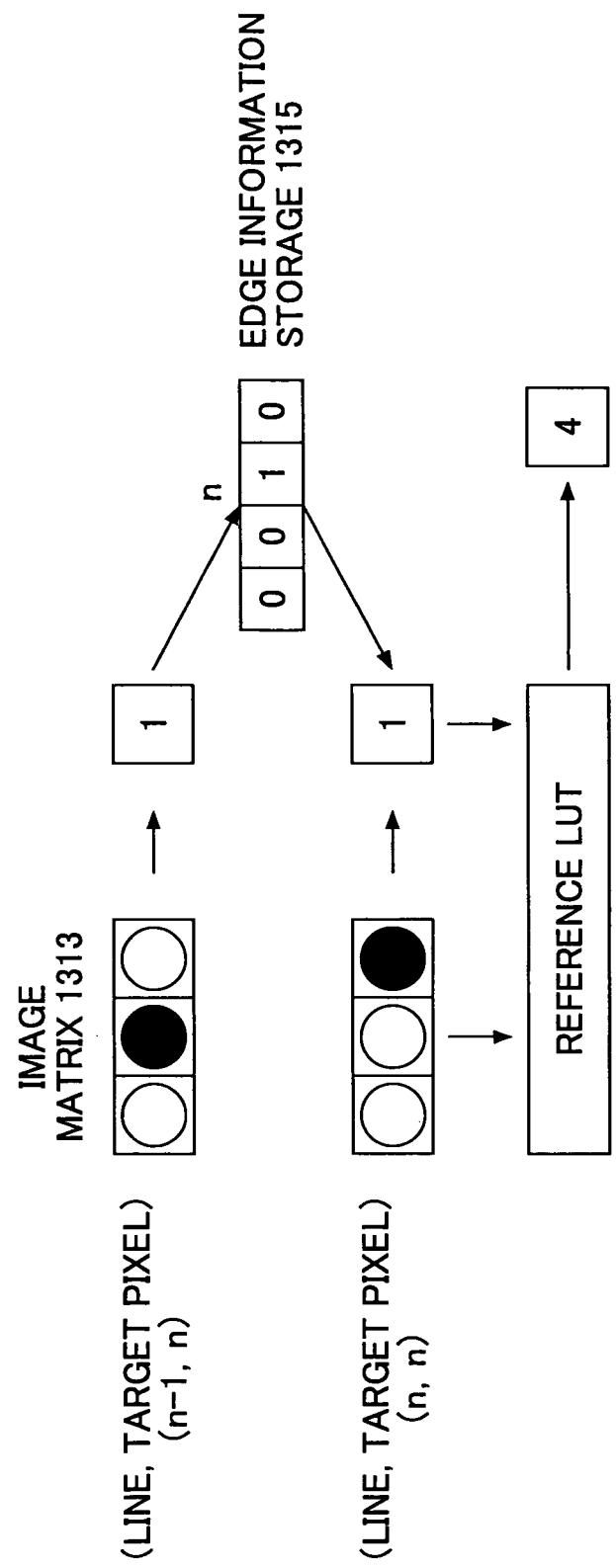
FIG. 14 is an operation diagram of an image matrix and an edge information storage.

FIG. 14 is an operation diagram of the image matrix 1313 and the edge information storage 1315. As shown in FIG. 14, the edge information storage 1315 detects the edge information of all pixels in the previous main scanning line in the image matrix 1313, and then stores the edge information.

As shown in the lower image matrix 1313 in FIG. 14, when the current process target (target pixel) is the (n) th pixel in the (n) th line, i.e., when the pixel at the center of the pixel window including white/white/black (○○●) is white, and the corresponding status value in the pixel window including white/black/white (○●○) in the previous line is a black pixel, "1" is stored in the edge information storage 1315 indicating that the target pixel of the previous line is at the edge.

Then, the look-up table 1314-2 determines, as the reference LUT, a different reference LUT from that used when the image matrix 1313 is white/white/black (○○●). The look-up table 1314-2 determines "4" to be the pixel value of the target pixel based on the determined reference LUT.

The look-up table 1314-2 sets an appropriate reference LUT corresponding to a data value, according to the condition of the actual image output by the digital copier 2. In order to do this, as described above, the control unit 1500 can appropriately set the reference LUTs and the data values of the reference LUTs.

The look-up table 1314-2 functions as a second reference look-up table determining unit including reference LUTs (reference look-up tables).

The hardware configuration of the digital copier 2 of the second embodiment is the same as that shown in FIG. 7, and is therefore not further described.

<Functions of Second Embodiment>

A description is given of a function of the second embodiment. The digital copier 2 according to the second embodiment performs an image forming process of appropriately evaluating vertical lines, horizontal lines, and diagonal lines, and appropriately adjusting the widths of lines according to settings.

The digital copier 2 has a characteristic that even if the same input multi-value pixel data was input, the vertical lines and the horizontal lines formed on transfer sheets would have different thicknesses, spaces would be formed between dots in a diagonal line such that the diagonal line becomes light (thin), and the lines would become thin or thick according to the resolution, which may lead to degraded image quality.

For example, when a line is formed by lighting the LD array 231 for a period of time corresponding to a line of one pixel in the main scanning direction, a light beam is radiated by lighting the LD array 231 for a period of time corresponding to a line of one pixel. However, depending on the beam spot diameter and developing conditions, the thickness of the line in the toner image formed on the transfer sheet may become different from the ideal thickness of a line of one pixel.

When the digital copier 2 according to the present embodiment has a characteristic that the widths in the main scanning direction of the vertical lines and diagonal lines become thinner than those of the original multi-value pixel data, a line thickening process is performed for thickening the lines. When the digital copier 2 has a characteristic that line widths become thicker than those of the original multi-value pixel data, a line thinning process is performed for thinning the lines.

In the digital copier 2, for the purpose of increasing the processing speed and making a simple, small-scale configuration, the multi-value pixel data is converted into the three statuses of a white pixel, a black pixel, or a halftone pixel. In the digital copier 2, the look-up table 1314-2 determines the status of an image (according to the three statuses of the pixels) based on the arrangement of status values in a pixel window of the image matrix 1313 of at least three pixels in the main scanning direction and one pixel in the sub scanning direction.

In the digital copier 2, the look-up table 1314-2 determines the reference LUT according to evaluation results, and determines to perform a line thickening process, a line thinning process, or "no process". The image matrix 1313 evaluates whether the pixel is at an edge portion or whether the pixel is an isolated line, and generates edge information of "1" if the pixel is at an edge portion and "0" if the pixel is not at an edge portion.

The look-up table 1314-2 changes the reference LUT of the look-up table 1314-2 based on the edge information in the edge information storage 1315, determines the pixel value of the target pixel, and corrects the input multi-value pixel data and outputs the corrected input multi-value pixel data as the output multi-value pixel data.

The following is a description of an image process performed on lines, where the resolutions in the main scanning direction and the sub scanning direction are the same, and the resolutions in the main scanning direction and the sub scanning direction are different, in the multi-value pixel data used for forming an image.

<Image Process on Line of One Pixel where Resolutions in Main Scanning Direction and Sub Scanning Direction are Same>

Figure 15:
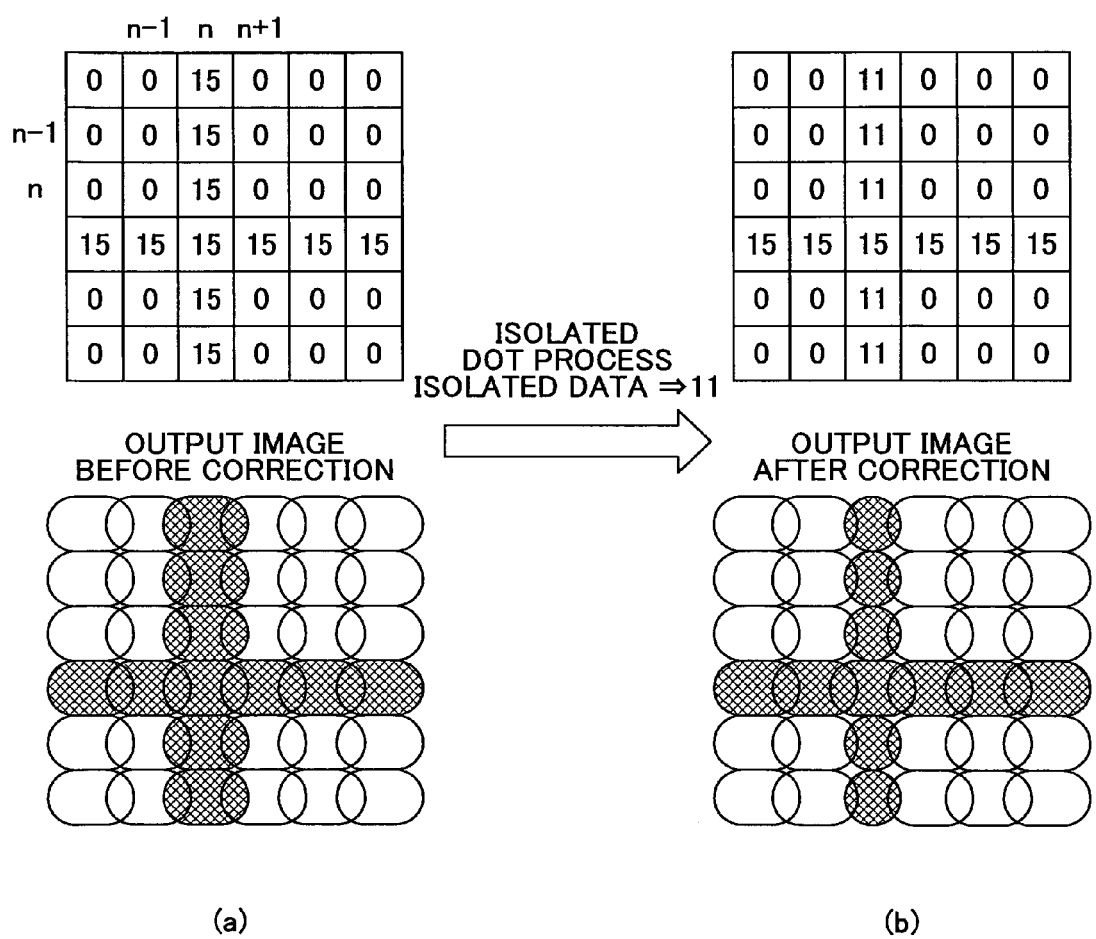
FIG. 15 illustrates a case of performing a thinning process of thinning a vertical line having a width corresponding to one pixel.

FIG. 15 illustrates a case of performing a thinning process of thinning a vertical line having a width corresponding to one pixel, when the resolutions in the main scanning direction and the sub scanning direction are the same, but the vertical line becomes thicker in the main scanning direction. FIG. 15 describes a case of thinning a vertical line of one pixel.

For example, in a case where the input multi-value pixel data is expressed in multivalue/4, the white threshold is "1", and the black threshold is "14", when the input multi-value pixel data is "14" or more, the status conversion unit 1311 determines the pixel as a black pixel; when the input multi-value pixel data is "1" or less, the status conversion unit 1311 determines the pixel as a white pixel; and when the input multi-value pixel data is "2" through "13", the status conversion unit 1311 determines the pixel as a halftone pixel.

For example, under the above conditions, in the input multi-value pixel data shown in FIG. 15 (*a*), there is a vertical line (vertical line with isolated dots) having pixel values of "15" at the (n) th pixels in the main scanning direction, and there is a horizontal line (horizontal line with isolated dots) having pixel values of "15" for the (n+1)th line in the sub scanning direction.

When the input multi-value pixel data shown in FIG. 15 (*a*) is actually printed out by the printer section 200, however, there may be cases where the line is thickened in the main scanning direction as shown in the lower part of FIG. 15 (*a*).

The digital copier 2 inputs the multi-value pixel data input from the image processing unit 1200 of the scanner section 300, to the target pixel code output unit 1312 of the printer image processing unit 1310, and also to the status conversion unit 1311.

As shown in FIG. 4, the status conversion unit 1311 classifies the input multi-value pixel data into three status values of "white", "black", and "halftone" based on a white threshold and a black threshold set from the control unit 1500, and outputs the classified data to an image matrix 1313.

The image matrix 1313 generates a pixel window of one or more lines, with at least one pixel in the sub scanning direction corresponding to the target pixel which is to be output, and three or more pixels in the main scanning direction including the pixels adjacent to the target pixel (before and behind the target pixel, with the target pixel located in the center). The image matrix 1313 arranges, in the generated pixel window, the status values of the pixels input from the status conversion unit 1311, and outputs the pixel window to the look-up table 1314-2.

The look-up table 1314-2 determines a reference LUT from those shown in FIG. 13 (*a*), based on the arrangement of the three kinds of status values in the pixel window input from the image matrix 1313, and outputs the data value of the determined reference LUT to the target pixel code output unit 1312.

The input multi-value pixel data as shown in FIG. 15 (*a*) is converted into the three kinds of status values by the status conversion unit 1311, the status values are arranged in a pixel window of three pixels in the main scanning direction at the image matrix 1313, and the pixel window is input to the look-up table 1314-2. The look-up table 1314-2 determines the center pixel in the pixel window as the target pixel, and determines the reference LUT based on the status values of the target pixel and the pixels adjacent to the target pixel on the left and right (actually, a reference LUT value is determined as shown in FIG. 13 (*a*)).

The look-up table 1314-2 determines that the line is an isolated dot line based on edge information in the edge information storage 1315, and determines to refer to the reference LUT used for converting the input data value of "15" into an output data value of "11" (see FIG. 13 (*a*) and FIG. 15 (*b*)). The look-up table 1314-2 outputs an output data value ("11" in this example) of the reference LUT to the target pixel code output unit 1312.

In accordance with an instruction from the look-up table 1314-2, the target pixel code output unit 1312 determines the output multi-value pixel data (codes of pixels to be output) from among the input multi-value pixel data from the image processing unit 1200 or the output data value from the look-up table 1314-2. The target pixel code output unit 1312 outputs the determined output multi-value pixel data to the light emission data generating unit 1320.

The light emission data generating unit 1320 generates a light source "on" signal for turning on/off of the LD array 231 and a light source light emission amount control signal for controlling the light amount, based on the multi-value pixel data from the target pixel code output unit 1312 of the printer image processing unit 1310. The light emission data generating unit 1320 outputs the generated signals to the light source control unit 1400.

The light source control unit 1400 turns on/off the LD array 231 and controls the light emission amount of the LD array 231, based on the light source "on" signal and the light source light emission amount control signal from the light emission data generating unit 1320 of the write control unit 1300.

As described above, in the case of FIG. 15, when the look-up table 1314-2 includes data values for the vertical line thinning process set in the reference LUTs as shown in FIG. 13 (*a*), or reference LUTs for the vertical line thinning process and reference LUTs for the vertical line thickening process, the look-up table 1314-2 determines a reference LUT for changing the data values "15" of the pixels into data values "11", to obtain the output multi-value pixel data.

Accordingly, in a case where the vertical line becomes thicker in the output image compared to that of the original image, data values are set for the vertical line thinning process. Even when the line is an isolated line, the edge information of the edge information storage 1315 may be used to evaluate whether the pixel is at an edge portion, and the vertical line can be appropriately thinned.

<Line Thinning Process on Diagonal Line of One Pixel Where Resolutions in Main Scanning Direction and Sub Scanning Direction are Same and Line Becomes Thick>

Figure 16:
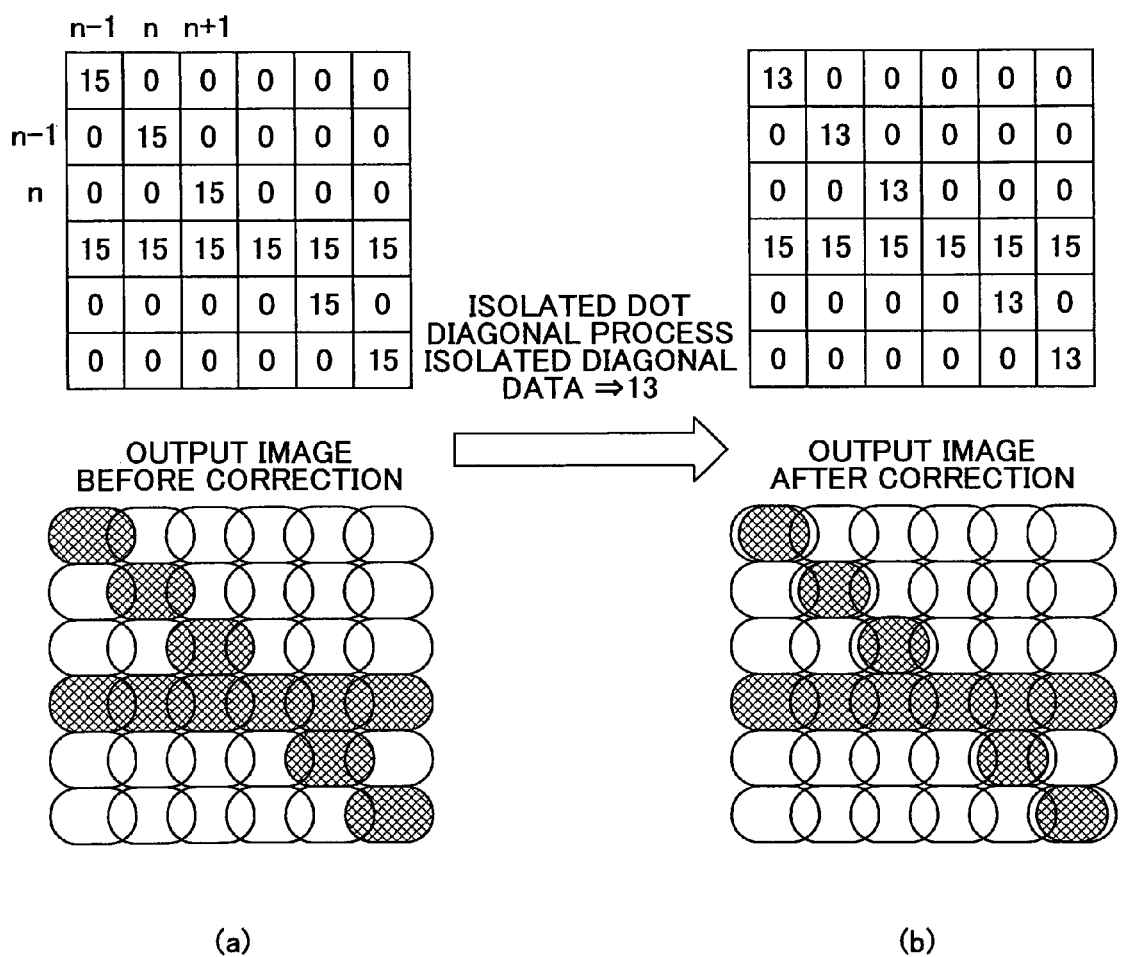
FIG. 16 describes a case of thinning a diagonal line having a width corresponding to one pixel.

Next, a description is given, with reference to FIG. 16, of an example of thinning a diagonal line of one pixel, when the resolutions in the main scanning direction and the sub scanning direction are the same, but the line becomes thicker in the main scanning direction. FIG. 16 describes a case of thinning a diagonal line having a width corresponding to one pixel.

Input multi-value pixel data shown in FIG. 16 (*a*) is converted into three kinds of status values by the status conversion unit 1311. At the image matrix 1313, the status values are arranged in a pixel window of three pixels in the main scanning direction. The pixel window is input to the look-up table 1314-2.

The look-up table 1314-2 determines the center pixel in the pixel window as the target pixel, and determines the reference LUT based on the status values of the target pixel and the pixels adjacent to the target pixel on the left and right. Then, as shown in FIG. 14, the look-up table 1314-2 determines that the line is a diagonal line with isolated dots, based on the edge information "1" of the (n) th pixel which is the target pixel of the previous line.

When the look-up table 1314-2 performs the line thinning process as shown in FIG. 16 (*b*), the look-up table 1314-2 determines the reference LUT for changing the data values "15" in the multi-value pixel data into data values "13".

Accordingly, the look-up table 1314-2 outputs the data value of the corresponding reference LUT ("13" in this example) to the target pixel code output unit 1312.

In accordance with an instruction from the look-up table 1314-2, the target pixel code output unit 1312 determines the output multi-value pixel data (codes of pixels to be output) from among the input multi-value pixel data from the image processing unit 1200 or the output data values from the look-up table 1314-2. The target pixel code output unit 1312 outputs the determined output multi-value pixel data to the light emission data generating unit 1320, and the data is processed as described above.

<Adjusting Image Quality of Diagonal Line of One Pixel where Resolutions in Main Scanning Direction and Sub Scanning Direction are Same>

Figure 17:
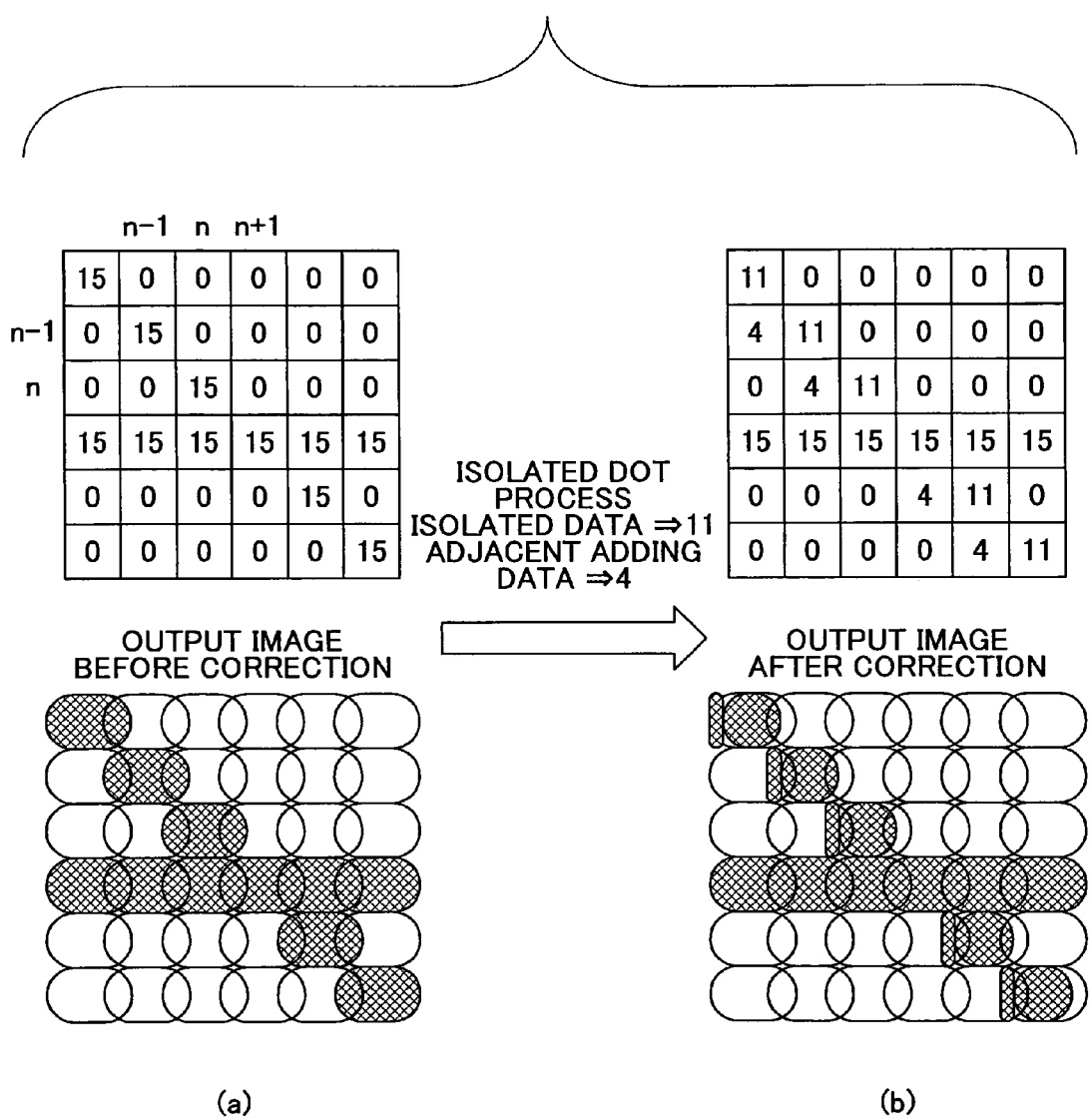
FIG. 17 describes a case of adjusting the image quality of a diagonal line of one pixel.

Next, a description is given, with reference to FIG. 17, of an example of adjusting the image quality of a diagonal line of one pixel, when the resolutions in the main scanning direction and the sub scanning direction are the same. FIG. 17 describes a case of adjusting the image quality of a diagonal line of one pixel.

Input multi-value pixel data shown in FIG. 17 (*a*) is converted into three kinds of status values by the status conversion unit 1311. At the image matrix 1313, the status values are arranged in a pixel window of three pixels in the main scanning direction. The pixel window is input to the look-up table 1314-2.

The look-up table 1314-2 determines the center pixel in the pixel window as the target pixel, and determines the reference LUT based on the status values of the target pixel and the pixels adjacent to the target pixel on the left and right. Then, the look-up table 1314-2 determines that the line is a diagonal line with isolated dots, based on the edge information in the edge information storage 1315.

In order to perform an image quality improvement process as shown in FIG. 17 (*b*), the look-up table 1314-2 determines a reference LUT corresponding to multi-value pixel data having a data value of "11" for black pixels in the sub scanning direction, and a reference LUT corresponding to multi-value pixel data having a data value of "4" for white pixels located before the aforementioned black pixels in the next line. Accordingly, it is determined that a single pixel corresponding to a data value of "15" is converted into two output multi-value pixel data items having a data value of "4" and a data value of "11".

The look-up table 1314-2 outputs a data value ("11" in this example) for the black pixel to the target pixel code output unit 1312, and also performs an adjacent pixel adding process of outputting a data value of "4" for the white pixel situated before the aforementioned black pixel.

In accordance with an instruction from the look-up table 1314-2, the target pixel code output unit 1312 determines the output multi-value pixel data (codes of pixels to be output) from among the input multi-value pixel data from the image processing unit 1200 or the data values from the look-up table 1314-2. The target pixel code output unit 1312 outputs the determined multi-value pixel data to the light emission data generating unit 1320, and the data is processed as described above.

Accordingly, the diagonal line having a width corresponding to one pixel in the input multi-value pixel data is converted into a diagonal line having a width corresponding to two pixels in the main scanning direction. Therefore, the diagonal line can be prevented from becoming light in a case where the diagonal line and the horizontal line have the same thickness, thereby improving image quality.

In FIG. 17, the lines before correction and after correction are made to have the same thickness. However, in a case where the diagonal line becomes thin, the reference LUTs can be selected such that the total pixel value of the two pixels in the main scanning direction after the correction process is higher than the pixel value before the correction process. Accordingly, when the diagonal line becomes thin, the diagonal line can be appropriately thickened.

<Pixel Process on One Dot Line where Resolutions in Main Scanning Direction and Sub Scanning Direction are Different>

A description is given, with reference to FIG. 18, of a line thickening process of thickening a vertical line, when the resolutions in the main scanning direction and the sub scanning direction are different, for example, main:sub=2:1, and when the vertical line becomes thinner in the main scanning direction (than the thickness of the line in the sub scanning direction). FIG. 18 describes a case of thickening a vertical line of one pixel when the resolutions in the main scanning direction and the sub scanning direction are different.

For example, in the input multi-value pixel data shown in FIG. 18 (*a*), there is a vertical line (vertical line with isolated dots) having pixel values of "15" at the (n) th pixels in the main scanning direction, and there is a horizontal line (horizontal line with isolated dots) having pixel values of "15" on the (n+1)th line in the sub scanning direction.

When the input multi-value pixel data shown in FIG. 18 (*a*) is actually printed out by the printer section 200, if the resolutions are different in the main scanning direction and sub scanning direction, such as 2:1, there may be cases where the line is thinned in the main scanning direction as shown in the lower part of FIG. 18 (*a*). The line in the printout may be thinned or thickened according to the resolution. For example, the digital copier 2 may set reference LUTs as shown in FIG. 13 (*b*) in the look-up table 1314-2, and perform a line thickening process or a line thinning process based on the resolution.

For example, with reference to FIG. 13 (*b*), the look-up table 1314-2 determines a reference LUT based on the arrangement of the three kinds of status values in the pixel window input from the image matrix 1313 and edge information, and outputs the data value of the determined reference LUT to the target pixel code output unit 1312.

Input multi-value pixel data shown in FIG. 18 (*a*) is converted into three kinds of status values at the status conversion unit 1311. At the image matrix 1313, the status values are arranged in a pixel window including three pixels in the main scanning direction. The pixel window is input to the look-up table 1314-2.

The look-up table 1314-2 determines the center pixel in the pixel window as the target pixel, and with reference to the table in FIG. 13 (*b*), determines the reference LUT based on the status values of the target pixel and the pixels adjacent to the target pixel on the left and right, and determines that the line is an isolated dot line based on the edge information in the edge information storage 1315.

The look-up table 1314-2 determines that the line is to be thickened based on the resolution, and as shown in FIG. 18 (*b*), the look-up table 1314-2 determines to refer to the reference LUT for converting the input data of "15" into the output data value of "15" and converting the white pixel next to the black pixel into "4".

Accordingly, the look-up table 1314-2 performs a so-called trailing black edge process, by outputting the output data value of the determined reference LUT to the target pixel code output unit 1312 ("15" in this example), and adding a data value of "4" to the white pixels next to the black pixels. In accordance with an instruction from the look-up table 1314-2, the target pixel code output unit 1312 determines the output multi-value pixel data (codes of pixels to be output) from among the input multi-value pixel data from the image processing unit 1200 or the output data values from the look-up table 1314-2. The target pixel code output unit 1312 outputs the determined output multi-value pixel data to the light emission data generating unit 1320, and the data is processed as described above, so that a vertical line of multi-value pixels corresponding to "15" and "4" in the main scanning direction is formed as shown in FIG. 18 (*b*), thereby thickening the vertical line.

Accordingly, in the case of FIG. 18, when it can be anticipated, based on the resolution, that the vertical line may become thinner than the horizontal line, and when data values for the vertical line thickening process are set in the reference LUTs of the look-up table 1314-2, or when there are reference LUTs for the line thickening process and reference LUTs for the line thinning process in the look-up table 1314-2, the look-up table 1314-2 determines to refer to the reference LUT for the line thickening process, and determines to set pixel data values of "15" and "4" with respect to each pixel having a data value of "15", to obtain the output multi-value pixel data.

Accordingly, in a case where the vertical line becomes thinner in the output image compared to that of the original image, data values are set for the vertical line thickening process. Even when the line is an isolated line, the edge information of the edge information storage 1315 is used to evaluate whether the pixel is at an edge portion, and the vertical line can be appropriately thickened.

<Line Thickening Process on Diagonal Line of One Pixel where Resolutions in Main Scanning Direction and Sub Scanning Direction are Different>

Figure 19:
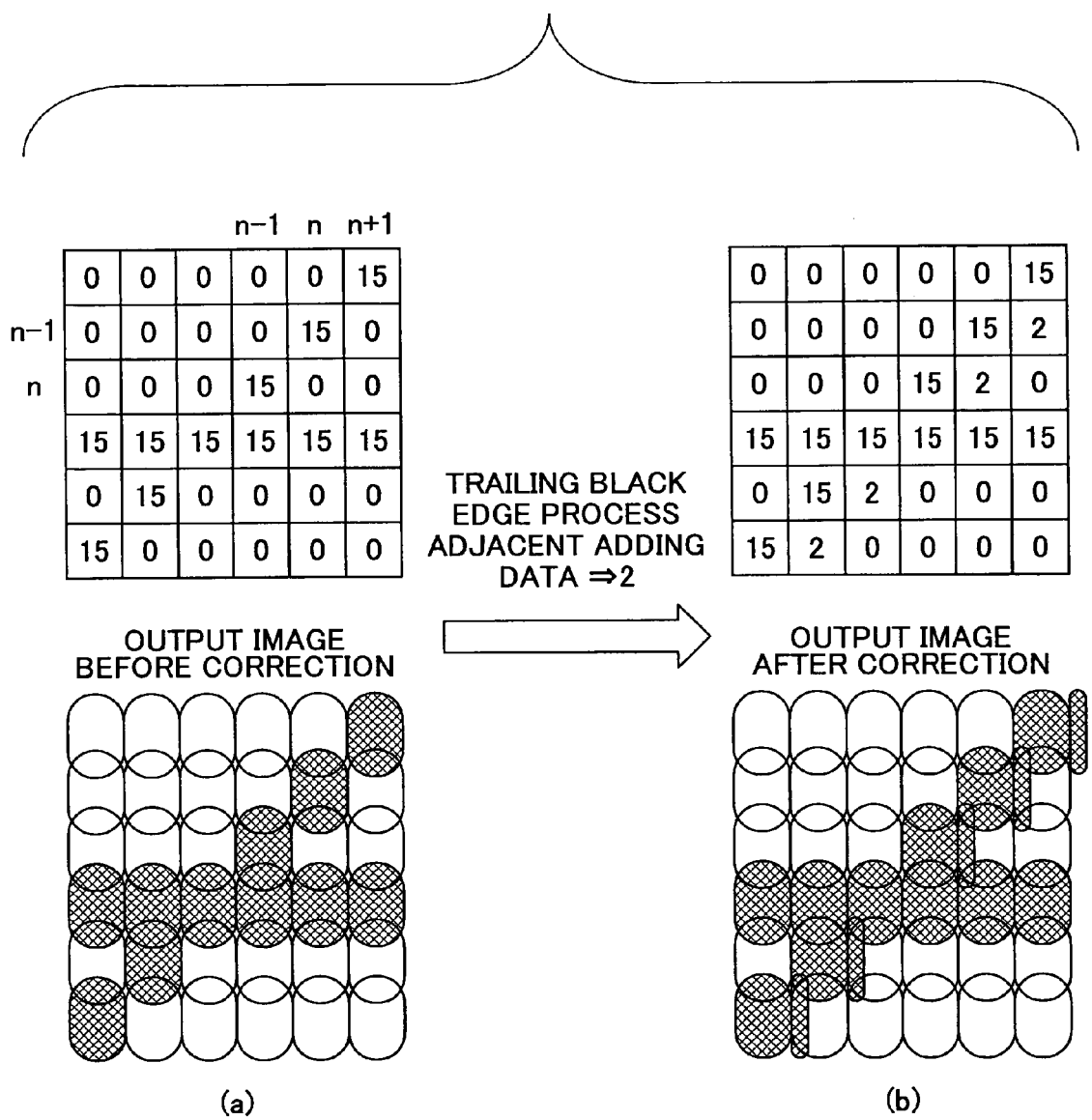
FIG. 19 describes a case of thickening a diagonal line when the diagonal line of one pixel when the resolutions in the main scanning direction and the sub scanning direction are different.

A description is given, with reference to FIG. 19, of a line thickening process of thickening a diagonal pixel having a width corresponding to one pixel, when the resolutions in the main scanning direction and the sub scanning direction are different. FIG. 19 describes a case of thickening a diagonal line when the diagonal line becomes thin in the main scanning direction, and when the resolutions in the main scanning direction and the sub scanning direction are different, for example, main:sub=2:1.

For example, in the input multi-value pixel data shown in FIG. 19 (*a*), there is a diagonal line (diagonal line with isolated dots) having pixel values of "15" at the (n) th pixels in the main scanning direction, and there is a horizontal line (horizontal line with isolated dots) having pixel values of "15" on the (n+1)th line in the sub scanning direction.

When the input multi-value pixel data shown in FIG. 19 (*a*) is actually printed out by the printer section 200, if the resolutions of the main scanning direction and sub scanning direction are 2:1, there may be cases where a line is thinned in the main scanning direction as shown in the lower part of FIG. 19 (*a*).

For obtaining the image shown in FIG. 19 (*b*), the look-up table 1314-2 determines a reference LUT based on the arrangement of the three kinds of status values in the pixel window input from the image matrix 1313 and edge information, and outputs the data value of the determined reference LUT to the target pixel code output unit 1312.

Input multi-value pixel data shown in FIG. 19 (*a*) is converted into three kinds of status values at the status conversion unit 1311. At the image matrix 1313, the status values are arranged in a pixel window including three pixels in the main scanning direction. The pixel window is input to the look-up table 1314-2.

The look-up table 1314-2 determines the center pixel in the pixel window as the target pixel, and determines the reference LUT based on the status values of the target pixel and the pixels adjacent to the target pixel on the left and right, and determines that the line is an isolated dot line based on the edge information in the edge information storage 1315.

The look-up table 1314-2 determines to refer to the reference LUT for the line thickening process, because the line becomes thin as the resolutions of the main scanning direction and sub scanning direction are 2:1.

The look-up table 1314-2 determines to refer to the reference LUT for converting the input multi-value pixel data of "15" into output multi-value pixel data of "15", and the reference LUT for converting the white pixel next to the black pixel into "2" (see FIG. 13 (b) and FIG. 19 (b)).

Accordingly, the look-up table 1314-2 performs a so-called trailing black edge process, by outputting the data value of the determined reference LUT to the target pixel code output unit 1312 ("15" in this example), and adding a data value of "2" to the white pixels next to the black pixels.

In accordance with an instruction from the look-up table 1314-2, the target pixel code output unit 1312 determines the output multi-value pixel data (codes of pixels to be output) from among the input multi-value pixel data from the image processing unit 1200 or the output data values from the look-up table 1314-2. The target pixel code output unit 1312 outputs the determined output multi-value pixel data to the light emission data generating unit 1320, and the data is processed as described above, so that a diagonal line of multi-value pixels corresponding to "15" and "2" in the main scanning direction is formed as shown in FIG. 19 (b), thereby thickening the diagonal line.

In the case of FIG. 19 where resolutions of the main scanning direction and sub scanning direction are 2:1, when data values for the diagonal line thickening process are set in the reference LUTs of the look-up table 1314-2, or when there are reference LUTs for the line thickening process and reference LUTs for the line thinning process in the look-up table 1314-2, the look-up table 1314-2 determines to refer to the reference LUT for the line thickening process, and determines to set pixel data values of "15" and "2" with respect to each pixel having a data value of "15", to obtain the output multi-value pixel data.

In a case where the diagonal line becomes thinner in the output image compared to that of the original image (due to the resolution difference), data values are set for the diagonal line thickening process. Even when the line is an isolated line, the edge information of the edge information storage 1315 may be used to evaluate whether the pixel is at an edge portion, and the diagonal line can be appropriately thickened.

<Pixel Process on Plural Dot Line where Resolutions in Main Scanning Direction and Sub Scanning Direction are the Same>

A description is given, with reference to FIG. 20, of a line thinning process of thinning a vertical line, when the resolutions in the main scanning direction and the sub scanning direction are the same, and when the vertical line becomes thicker in the main scanning direction. FIG. 20 describes a case of thinning a vertical line of two pixels.

For example, in the input multi-value pixel data shown in FIG. 20 (a), there is a vertical line (vertical line of two pixels) having pixel values of "15" at the (n) th pixels and the (n+1)th pixels in the main scanning direction, and there is a horizontal line (horizontal line of two pixels) having pixel values of "15" at the pixels on the (n) th line and the (n+1)th line in the sub scanning direction.

When the input multi-value pixel data shown in FIG. 20 (a) is actually printed out by the printer section 200, if the resolutions are the same in the main scanning direction and sub scanning direction, there may be cases where the line is thickened in the main scanning direction as shown in the lower part of FIG. 20 (a).

Input multi-value pixel data shown in FIG. 20 (a) is converted into three kinds of status values at the status conversion unit 1311. At the image matrix 1313, the status values are arranged in a pixel window including three pixels in the main scanning direction. The pixel window is input to the look-up table 1314-2.

The look-up table 1314-2 determines the center pixel in the pixel window as the target pixel, and determines the reference LUT based on the status values of the target pixel and the pixels adjacent to the target pixel on the left and right, and performs a leading edge process based on the edge information in the edge information storage 1315.

As shown in FIG. 20 (b), the look-up table 1314-2 determines to refer to a reference LUT for setting a pixel value of less than or equal to "13" ("12" in the example shown in FIG. 20) for a black pixel which is the center pixel (target pixel) of white/black/black (○●●) when the edge information indicates "1", and to a reference LUT for setting a pixel value of less than or equal to "13" ("12" in the example shown in FIG. 20) for a black pixel which is the center pixel (target pixel) of black/black/white (●●○) when the edge information indicates "1".

Accordingly, the look-up table 1314-2 performs a leading edge process, by outputting the output data value of the determined reference LUT to the target pixel code output unit 1312 ("12" in this example), and a trailing edge process, by outputting the output data value of the same reference LUT also for the next black pixel ("12" in this example).

In accordance with an instruction from the look-up table 1314-2, the target pixel code output unit 1312 determines the output multi-value pixel data (codes of pixels to be output) from among the input multi-value pixel data from the image processing unit 1200 or the output data values from the look-up table 1314-2. The target pixel code output unit 1312 outputs the determined output multi-value pixel data to the light emission data generating unit 1320, and the data is processed as described above, so that a vertical line of two pixels, which are multi-value pixels corresponding to "12" and "12" in the main scanning direction, is formed as shown in FIG. 20 (b), thereby thinning the vertical line.

Accordingly, the width of line having a width corresponding to plural pixels can be appropriately adjusted.

<Line Thinning Process on Diagonal Line of Two Pixels Where Resolutions in Main Scanning Direction and Sub Scanning Direction are the Same>

Figure 21:
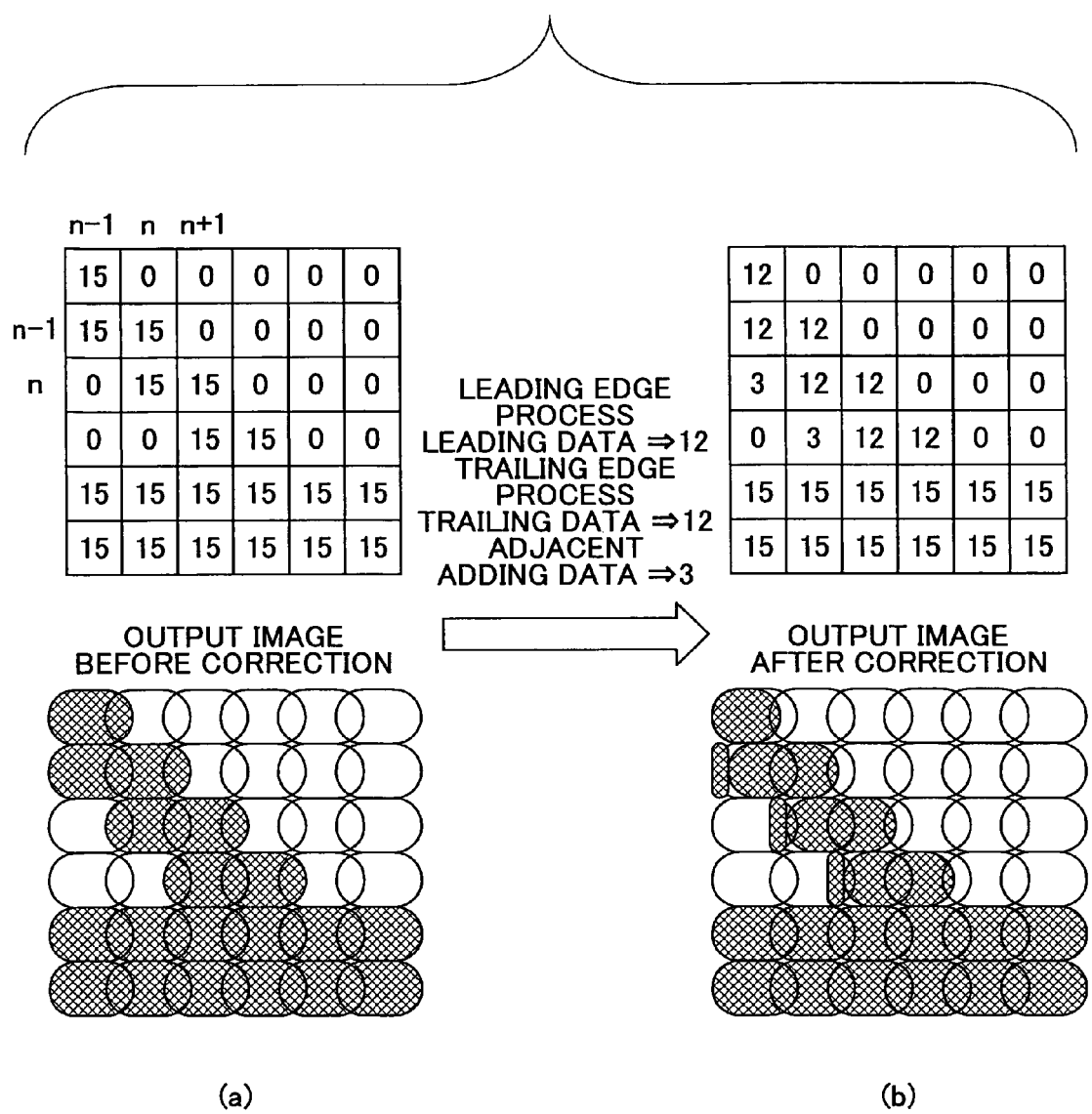
FIG. 21 describes a case of thinning a diagonal line of two pixels.

A description is given, with reference to FIG. 21, of a line thinning process of thinning a diagonal line of two pixels, when the resolutions in the main scanning direction and the sub scanning direction are the same. FIG. 21 describes a case of thinning a diagonal line of two pixels.

For example, in the input multi-value pixel data shown in FIG. 21 (a), there is a diagonal line (diagonal line of two pixels) corresponding to input image data of multi-value/4 bits where the edge information is "1" at the (n−1)th pixel and the (n) th pixel in the main scanning direction on the (n−1)th line in the sub scanning direction, and a horizontal line (horizontal line of two pixels) having pixel values of "15" at the pixels on the (n+2)th line and the (n+3)th line in the sub scanning direction.

When the input multi-value pixel data shown in FIG. 21 (a) is actually printed out by the printer section 200, there may be cases where the line is thickened in the main scanning direction as shown in the lower part of FIG. 21 (a).

Input multi-value pixel data shown in FIG. 21 (a) is converted into three kinds of status values at the status conversion unit 1311. At the image matrix 1313, the status values are arranged in a pixel window including three pixels in the main scanning direction. The pixel window is input to the look-up table 1314-2.

The look-up table 1314-2 determines the center pixel in the pixel window as the target pixel, determines to refer to reference LUTs for a line thinning process in which additional pixels are used, based on the status values of the target pixel and the pixels adjacent to the target pixel on the left and right, and determines that the line is an isolated dot line based on the edge information in the edge information storage 1315.

As shown in FIG. 21 (b), the look-up table 1314-2 determines to refer to the reference LUT for converting the multi-value pixel data of "15" into multi-value pixel data of "12", and the reference LUT for converting the white pixel next to the black pixel into "3".

Accordingly, the look-up table 1314-2 performs a so-called leading edge process, a trailing edge process, and an adjacent pixel adding process, by outputting the output data value of the determined reference LUT to the target pixel code output unit 1312 ("12" in this example), and adding a data value of "3" to the white pixels next to the black pixels.

In accordance with an instruction from the look-up table 1314-2, the target pixel code output unit 1312 determines the output multi-value pixel data (codes of pixels to be output) from among the input multi-value pixel data from the image processing unit 1200 or the output data values from the look-up table 1314-2. The target pixel code output unit 1312 outputs the determined output multi-value pixel data to the light emission data generating unit 1320, and the data is processed as described above, so that a diagonal line of multi-value pixels corresponding to "12", "12", and "3" in the main scanning direction is formed as shown in FIG. 21 (b), thereby thinning the diagonal line.

In the case of FIG. 21, the look-up table 1314-2 determines to refer to the reference LUT for the diagonal line thickening process for a diagonal line of plural pixels, and determines to set pixel data values of "12", "12", and "3" with respect to the diagonal line of two pixels each corresponding to data values of "15", to obtain the output multi-value pixel data.

In a case where the diagonal line becomes thicker in the output image compared to that of the original image, a reference LUT for the diagonal line thinning process is used. Even when the diagonal line has a width corresponding to plural pixels, the edge information of the edge information storage 1315 may be used to appropriately evaluate whether the pixel is at an edge portion, and the diagonal line can be appropriately thinned.

In the above description, a vertical line or a diagonal line having a width corresponding to plural pixels is thinned. The same method can be applied in the case of thickening these lines, by setting the reference LUTs so that they can be applied to a line thickening process, or by determining to refer to a reference LUT prepared for a line thickening process.

<Third Embodiment>

Figure 22:
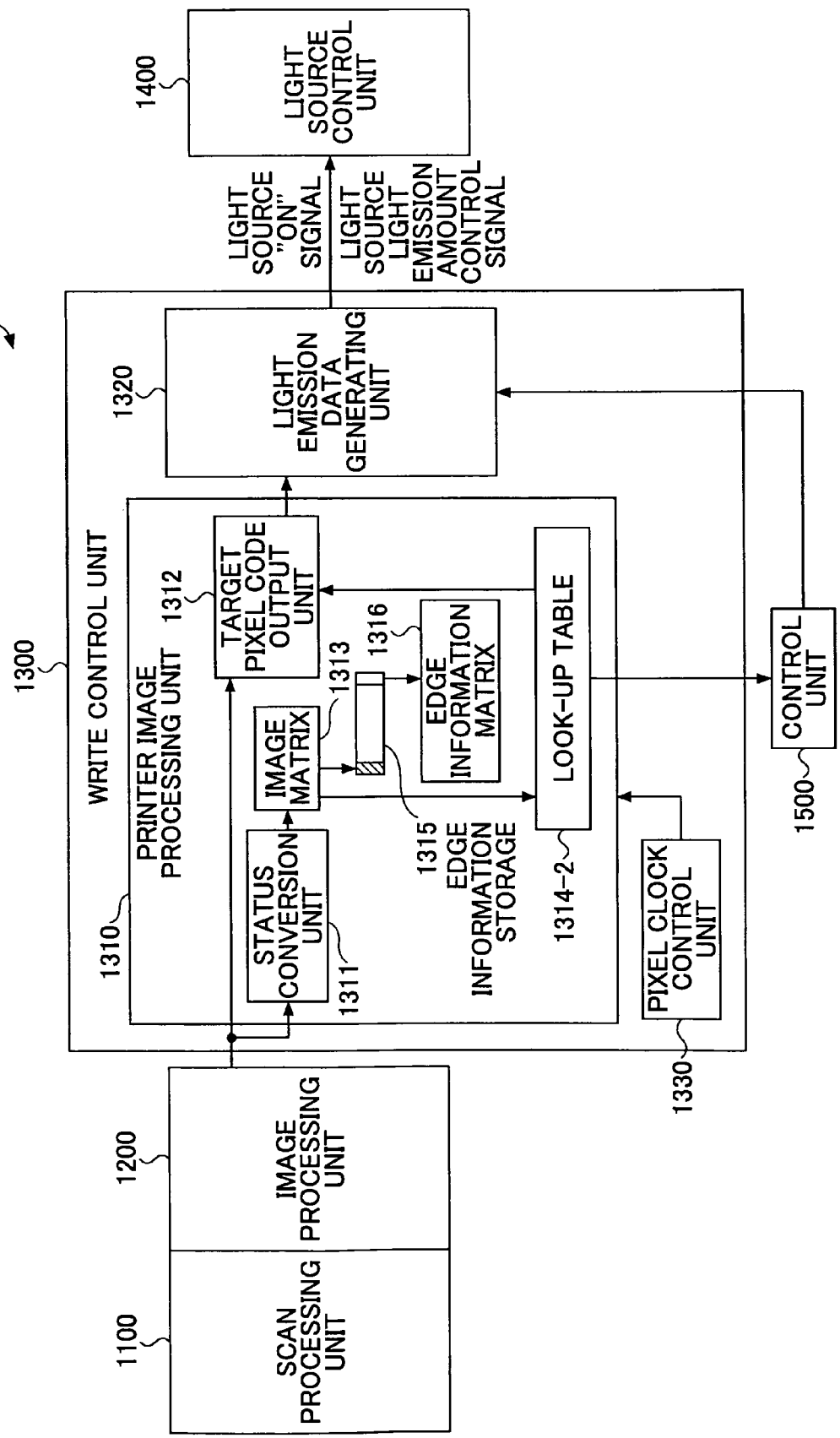
FIG. 22 is a block diagram of a relevant circuit of a digital copier according to a third embodiment of the present invention.

Next, a description is given of a third embodiment of the present invention. FIG. 22 is a block diagram of a relevant circuit of a digital copier 3 according to the third embodiment.

In the second embodiment, the printer image processing unit 1310 stores edge information in the edge information storage 1315, and performs a process of changing, in accordance with the edge information in the edge information storage 1315, the reference LUT to be referred to in the look-up table 1314-2 which is determined based on the edge information and the status values in the image matrix 1313.

However, as shown in FIG. 22, an edge information matrix 1316 can be provided in the digital copier 3 according to the third embodiment.

Figure 23:
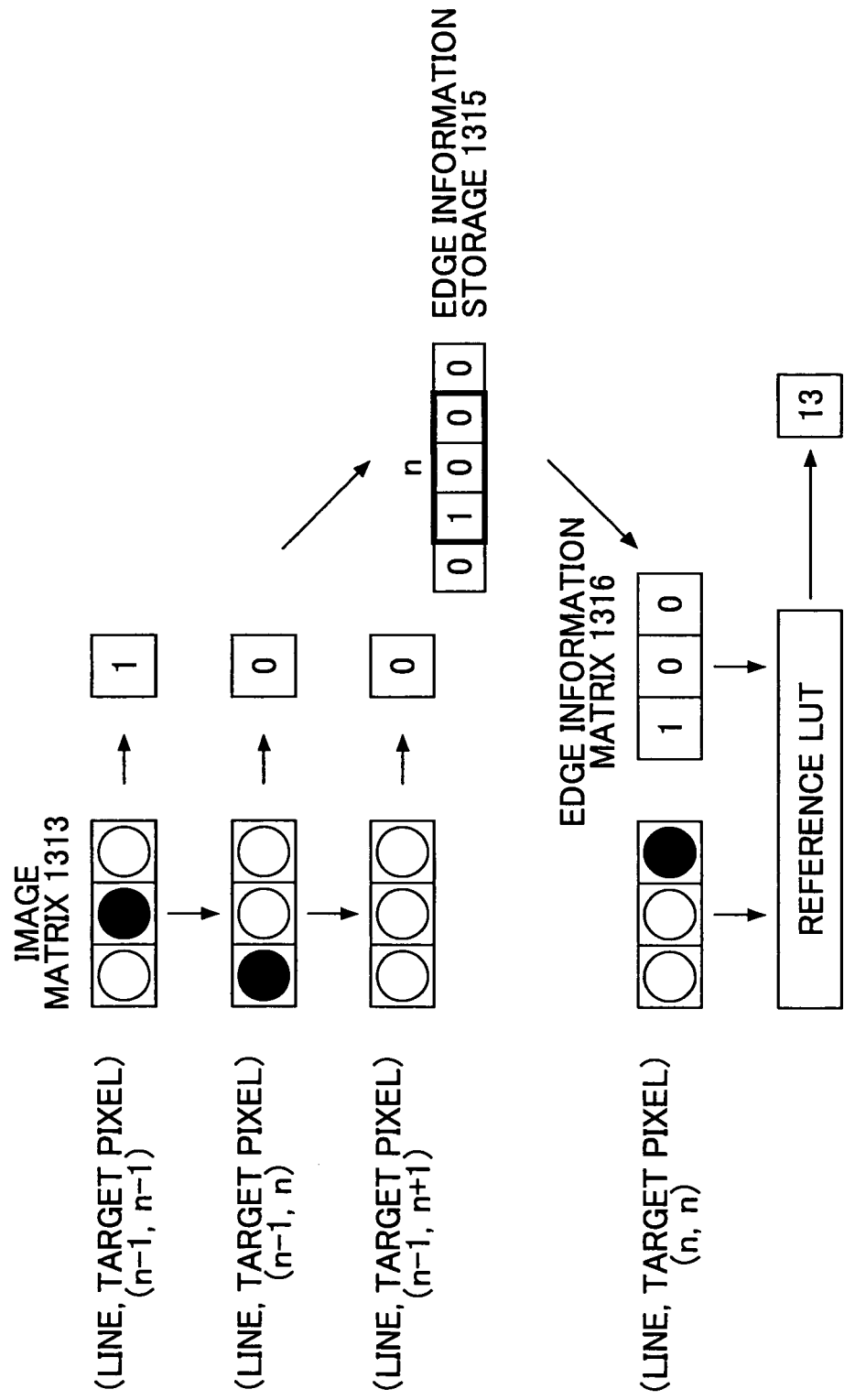
FIG. 23 is an operation diagram of an image matrix, an edge information storage, and an edge information matrix shown in FIG. 22.

FIG. 23 is an operation diagram of the image matrix 1313, the edge information storage 1315, and the edge information matrix 1316 shown in FIG. 22. As shown in FIG. 23, the edge information matrix (edge information storing unit) 1316 receives edge information from the edge information storage 1315, and holds the edge information of positions in a scanning line before the target pixel and the pixels adjacent to the target pixels in the image matrix 1313, for three or more pixels in the main scanning direction and one or more lines of pixels in the sub scanning direction.

When the printer image processing unit 1310 includes an edge information matrix 1316, as shown in FIG. 23, the reference LUT in the look-up table 1314-2 is determined based on the edge information in the edge information matrix 1316 and the status values of the image matrix 1313. Then, the printer image processing unit 1310 outputs the pixel value set by the determined reference LUT to the target pixel code output unit 1312.

FIG. 24 illustrates an example of contents of the look-up table 1314-2 in FIG. 22, for cases where the resolutions in the main scanning direction and the sub scanning direction are the same and different. Look-up tables such as those illustrated in FIGS. 24 (a) and (b) are set in the look-up table 1314-2.

In the look-up table 1314-2, there are tables for both cases of main:sub=1:1 and main:sub=2:1, where each table indicates an association between reference LUTs (reference LUT values) corresponding to arrangements of status values, and matrix values of the edge information matrix 1316.

For example, in FIG. 24 (a) indicating the table for the case of main:sub=1:1, "11" is set as the reference LUT value when the matrix value of the edge information matrix 1316 is "010", and the status values are white/black/white (○●○).

In FIG. 24 (b) indicating the table for the case of main:sub=2:1, "15" is set as the reference LUT value when the matrix value of the edge information matrix 1316 is "010", and the status values are white/black/white (○●○).

When the input multi-value pixel data is as shown in FIG. 15, i.e., the resolutions in the main scanning direction and the sub scanning direction are the same, and the line becomes thick in the main scanning direction when printed out by the printer section 200, the edge information in the edge information matrix 1316 at the (n−1, n, n+1)th pixels on the (n−1) th line is (0, 1, 0), and the input multi-value pixel data represents a vertical line expressed in multi-value/4 bits. In this case, the look-up table 1314-2 shown in FIG. 24 (a) is used to perform the thinning process in the same manner as that described with reference to FIG. 15.

In the case of the diagonal line shown in FIG. 16, the edge information in the edge information matrix 1316 at the (n−1, n, n+1)th pixels on the (n−1)th line is (1, 0, 0), and the input multi-value pixel data is expressed in multi-value/4 bits as shown in FIG. 23. In the case of this diagonal line, the pixel window of the image matrix 1313 at the (n) th pixel on the (n) th line includes white/black/white (○●○), and a value "13"

is set as the reference LUT value of the diagonal line in the look-up table 1314-2 shown in FIG. 24 (*a*), thereby thinning the diagonal line.

In the case of a diagonal line in the opposite direction, a line thinning process can performed with edge information (0, 0, 1) in the edge information matrix 1316, and white/black/white (○●○) in the pixel window of the image matrix 1313.

When the resolutions in the main scanning direction and the sub scanning direction are different (main:sub=2:1), the table values of the look-up table 1314-2 shown in FIG. 24 (*b*) are used to perform the process of adjusting the widths of the lines by adding pixels. For example, when thickening the lines, the same process is performed as that described with reference to FIGS. 18 and 19; however, the edge evaluation can be performed more precisely by using the edge information in the edge information matrix 1316 and the table values in the look-up table 1314-2 as shown in FIG. 24 (*b*).

In the case of the vertical line of two pixels as shown in FIG. 20, the edge information in the edge information matrix 1316 is "1" for the (n, n+1)th pixels on the (n−1)th line, and the input multi-value pixel data is a vertical line expressed in multi-value/4 bits, and the same process as that described with reference to FIG. 20 is performed to thin the line.

In this case, by using the edge information matrix 1316, the edge evaluation can be precisely performed and the image processing can be performed even more appropriately.

Furthermore, in the case of the diagonal line of two pixels as shown in FIG. 21, the edge information in the edge information matrix 1316 is "(1, 1, 0)" for the (n−1, n, n+1)th pixels on the (n−1)th line, and the input multi-value pixel data is a diagonal line expressed in multi-value/4 bits.

In this case, the pixel window of the image matrix 1313 at the (n−1, n, n+1)th pixels on the (n) th line includes white/black/black (○●●), and a black pixel with a data value of "12" is set as the reference LUT of the diagonal line. The pixel window in the image matrix 1313 at the (n, n+1, n+2)th pixels on the (n) th line includes black/black/white (●●○), a black pixel with a data value of "12" is set as the reference LUT of the diagonal line, and an additional pixel with a data value of "3" is set at the (n−1)th pixel on the (n) th line, so that the diagonal line can be thinned.

The same method can be applied for a diagonal line slanted in a direction opposite to that of FIG. 21. In this case, a black pixel with a data value of "12" is set as the reference LUT value for the target pixel when the edge information in the edge information matrix 1316 is (0, 1, 1), so that the diagonal line can be thinned.

In addition, a line thickening process can be performed by performing the same process as above on the diagonal line, and appropriately combining the data value of the position of the original black pixel with a data value of an additional pixel.

In the above description, in order to adjust the width of the line, the image matrix 1313 having a size of three pixels in the main scanning direction and one pixel in the sub scanning direction is used. However, the size of the image matrix 1313 is not so limited. Moreover, the image matrix 1313 can be used in combination with a matrix for detecting other images, which is used in the digital copier 2.

In this manner, with respect to the lines of plural pixels as those shown in FIGS. 20 and 21, it is appropriately considered whether the pixels correspond to an edge in determining the reference LUT, so that the line can be appropriately thinned/thickened.

The hardware configuration of the digital copier 3 is the same as that shown in FIG. 7, and is not further described.

In the digital copier 2 or the digital copier 3, the control unit 1500 (selecting unit) can appropriately select whether the look-up table 1314-2 is to refer to the edge information acquired in the edge information storage 1315 and the edge information generated by the edge information matrix 1316.

Accordingly, the reference look-up table can be determined depending on how the digital copier 2 or the digital copier 3 is used, to perform the pixel process.

As described above, with an embodiment of the present invention, pixels of vertical lines and diagonal lines expressed by input multi-value pixel data can be processed with a simple configuration and in an appropriate manner.

An embodiment of the present invention is applicable to an image forming apparatus such as a copier, a multifunction peripheral, and a printer, an image forming method, and an image forming program product for correcting the dot configuration in an image.

The present application is based on Japanese Priority Patent Application No. 2008-040753, filed on Feb. 22, 2008, Japanese Priority Patent Application No. 2008-064929, filed on Mar. 13, 2008, and Japanese Priority Patent Application No. 2009-007077, filed on Jan. 15, 2009, the entire contents of which are hereby incorporated herein by reference.

What is claimed is:

1. An image forming apparatus comprising:
an image forming unit configured to form an image based on input multi-value pixel data formed by using an input data value or output multi-value pixel data formed by using an output data value;
a status conversion unit configured to convert the input multi-value pixel data into status values based on an achromatic threshold and a maximum color threshold, wherein each of the status values corresponds to one of at least three kinds of status values comprising an achromatic status value, a maximum color status value, and a halftone status value;
plural reference look-up tables each indicating an association between an arrangement of the status values of the pixels in a pixel window, and an output data value for forming the output multi-value pixel data, the pixels arranged in the pixel window corresponding to the status values which are converted by the status conversion unit from the input multi-value pixel data, and the pixels including at least a target pixel and a number of adjacent pixels provided on both sides of the target pixel;
a first reference look-up table determining unit configured to determine a target reference look-up table from among the plural reference look-up tables, by using a table including a column of a three pixel arrangement, a column of pixel arrangement descriptions and a column of reference look-up table identifiers and based on the arrangement of the status values of the target pixel and the adjacent pixels in the pixel window, the pixel window comprising three pixels in a main scanning direction and one or more pixels in a sub scanning direction; and
an output data generating unit configured to change the input data value of the input multi-value pixel data, into the output data value of the target reference look-up table determined by the first reference look-up table determining unit to form the output multi-value pixel data, and to output the output multi-value pixel data to the image forming unit.

2. The image forming apparatus according to claim 1, wherein,
upon the halftone status value being included in the pixel window, the output data generating unit outputs the input multi-value pixel data to the image forming unit.

3. The image forming apparatus according to claim 1, wherein,
upon all of the pixels in the pixel window corresponding to the achromatic status values or all of the pixels in the pixel window corresponding to the maximum color status values, the output data generating unit outputs the input multi-value pixel data to the image forming unit.

4. The image forming apparatus according to claim 1, wherein,
the achromatic threshold and the maximum color threshold of the status conversion unit and the output data values in the plural reference look-up tables are set; and
when performing a line thinning process of thinning the image formed by the image forming unit in a main scanning direction, an achromatic-reference output data value which corresponds to the output data value provided in the target reference look-up table when the target pixel corresponds to the achromatic status value, a maximum color-reference output data value which corresponds to the output data value provided in the target reference look-up table when the target pixel corresponds to the maximum color status value, the achromatic threshold, and the maximum color threshold satisfy,
achromatic-reference output data value≦achromatic threshold<maximum color-reference output data value≦maximum color threshold.

5. The image forming apparatus according to claim 1, wherein,
the achromatic threshold and the maximum color threshold of the status conversion unit and the output data values in the plural reference look-up tables are set, and
when performing a line thickening process of thickening the image formed by the image forming unit in the main scanning direction, an achromatic-reference output data value which corresponds to the output data value provided in the target reference look-up table when the target pixel corresponds to the achromatic status value, a maximum color-reference output data value which corresponds to the output data value provided in the target reference look-up table when the target pixel corresponds to the maximum color status value, the achromatic threshold, and the maximum color threshold satisfy, achromatic threshold achromatic-reference output data value<maximum color threshold≦maximum color-reference output data value.

6. The image forming apparatus according to claim 1, further comprising:
an edge information acquiring unit configured to acquire edge information of at least a previous line before a line comprising the target pixel in the pixel window; and
a second reference look-up table determining unit configured to determine the target reference look-up table from among the plural reference look-up tables based on the arrangement of the status values of the pixels in the pixel window and the edge information, wherein,
the output data generating unit is configured to change the input data value of the input multi-value pixel data, into the output data value of the target reference look-up table determined by the second reference look-up table determining unit to form the output multi-value pixel data, and to output the multi-value pixel data to the image forming unit.

7. The image forming apparatus according to claim 6, further comprising:
an edge information storing unit configured to store a part of the edge information of the previous line acquired by the edge information acquiring unit, the part of the edge information corresponding to a pixel position in the previous line corresponding to that of the target pixel and a number of pixels before and after the pixel position.

8. The image forming apparatus according to claim 6, wherein
the second reference look-up table determining unit determines the target reference look-up table based on the edge information and the arrangement of the status values of the pixels in the pixel window, and the pixel window comprises three pixels in the main scanning direction and one or more pixels in the sub scanning direction.

9. The image forming apparatus according to claim 6, wherein,
when performing a line thinning process of thinning the image formed by the image forming unit in a main scanning direction or when performing a line thickening process of thickening the image formed by the image forming unit in the main scanning direction, the second reference look-up table determining unit determines the target reference look-up table so as to convert the input data value of the target pixel into the output data value in accordance with the line thinning process or the line thickening process, and to set the output data value of an additional pixel that is added adjacent to the target pixel corresponding to an edge position.

10. The image forming apparatus according to claim 1, wherein,
at least one of the achromatic threshold and the maximum color threshold of the status conversion unit, and the output data values in the plural reference look-up tables are set.

11. The image forming apparatus according to claim 6, wherein,
the second reference look-up table determining unit selects the target reference look-up table which is used for thickening the image formed by the image forming unit in a main scanning direction, or the target reference look-up table which is used for thinning the image formed by the image forming unit in the main scanning direction.

12. The image forming apparatus according to claim 6, wherein,
when performing a line thinning process of thinning the image formed by the image forming unit in a main scanning direction, the second reference look-up table determining unit determines the target reference look-up table so as to convert the input data value of the target pixel into the output data value corresponding to a thinning data value which is lower than the input data value, and to set the output data value of an additional pixel that is added adjacent to the target pixel, such that,
output data value of additional pixel≦maximum color threshold minus thinning data value.

13. The image forming apparatus according to claim 6, further comprising:
a selecting unit configured to select whether the edge information is to be referred to in determining the target reference look-up table, and wherein,
the second reference look-up table determining unit refers to the edge information to determine the target reference look-up reference table when the selecting unit selects that the edge information is to be referred to.

14. The image forming apparatus according to claim 1, wherein,
the image forming unit is configured to form the image by forming a dot-type electrostatic latent image by controlling a writing light that is radiated onto a photoconductor based on the input multi-value pixel data or the output multi-value pixel data; developing the electrostatic latent image with a developer to form a developer image; and transferring the developer image onto a recording medium.

15. An image forming method comprising:
forming an image based on input multi-value pixel data formed by an input data value or output multi-value pixel data formed by an output data value;
converting the input multi-value pixel data into status values based on an achromatic threshold and a maximum color threshold, wherein each of the status values corresponds to one of at least three kinds of status values comprising an achromatic status value, a maximum color status value, and a halftone status value;
determining a first target reference look-up table from among plural reference look-up tables by using a table including a column of a three pixel arrangement, a column of pixel arrangement descriptions and a column of reference look-up table identifiers and based on an arrangement of the status values of a target pixel and adjacent pixels in a pixel window, each of the plural reference look-up tables indicating an association between the arrangement of the status values of the pixels in the pixel window and an output data value for forming the output multi-value pixel data, wherein the pixels arranged in the pixel window correspond to the status values, and comprise the target pixel and a number of the adjacent pixels provided on both sides of the target pixel, the pixel window comprising three pixels in a main scanning direction and one or more pixels in a sub scanning direction; and changing the input data value of the input multi-value pixel data, into the output data value of the first target reference look-up table to form the output multi-value pixel data, and outputting the output multi-value pixel data for use at the image forming step.

16. The image forming method according to claim 15, further comprising:
acquiring edge information of at least a previous line before a line comprising the target pixel in the pixel window; and
determining a second target reference look-up table from among the plural reference look-up tables based on the arrangement of the status values of the pixels in the pixel window and the edge information, wherein
the input data value of the input multi-value pixel data is changed into the output data value of the second target reference look-up table to form the output multi-value pixel data, and the output multi-value pixel data is output for use at the image forming.

17. An image forming program product comprising instructions for causing a computer to:
form an image based on input multi-value pixel data formed by an input data value or output multi-value pixel data formed by an output data value;
convert the input multi-value pixel data into status values based on an achromatic threshold and a maximum color threshold, wherein each of the status values corresponds to one of at least three kinds of status values comprising an achromatic status value, a maximum color status value, and a halftone status value;
determine a first target reference look-up table from among plural reference look-up tables by using a table including a column of a three pixel arrangement, a column of pixel arrangement descriptions and a column of reference look-up table identifiers and based on an arrangement of the status values of a target pixel and adjacent pixels in a pixel window, each of the plural reference look-up tables indicating an association between the arrangement of the status values of the pixels in the pixel window and an output data value for forming the output multi-value pixel data, wherein the pixels arranged in the pixel window correspond to the status values which are converted at the converting from the input multi-value pixel data, and comprise the target pixel and a number of the adjacent pixels provided on both sides of the target pixel, the pixel window comprising three pixels in a main scanning direction and one or more pixels in a sub scanning direction; and
change the input data value of the input multi-value pixel data, into the output data value of the first target reference look-up table to form the output multi-value pixel data, and outputting the output multi-value pixel data for use at the image forming.

18. The image forming program product according to claim 17, further comprising instructions for causing the computer to:
acquire edge information of at least a previous line before a line comprising the target pixel in the pixel window; and
determine a second target reference look-up table from among the plural reference look-up tables based on the arrangement of the status values of the pixels in the pixel window and the edge information, wherein
the input data value of the input multi-value pixel data is changed into the output data value of the second target reference look-up table to form the output multi-value pixel data, and the output multi-value pixel data is output for use at the image forming.

* * * * *

UNITED STATES PATENT AND TRADEMARK OFFICE
CERTIFICATE OF CORRECTION

| | | |
|---|---|---|
| PATENT NO. | : 8,427,704 B2 | Page 1 of 1 |
| APPLICATION NO. | : 12/379344 | |
| DATED | : April 23, 2013 | |
| INVENTOR(S) | : Tanaka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this
Sixteenth Day of December, 2014

Michelle K. Lee
*Deputy Director of the United States Patent and Trademark Office*